US010203209B2

United States Patent
Roumeliotis et al.

(10) Patent No.: US 10,203,209 B2
(45) Date of Patent: Feb. 12, 2019

(54) RESOURCE-AWARE LARGE-SCALE COOPERATIVE 3D MAPPING USING MULTIPLE MOBILE DEVICES

(71) Applicants: Regents of the University of Minnesota, Minneapolis, MN (US); Google LLC, Mountain View, CA (US)

(72) Inventors: Stergios I. Roumeliotis, St Paul, MN (US); Esha D. Nerurkar, Mountain View, CA (US); Joel Hesch, Mountain View, CA (US); Chao Guo, Minneapolis, MN (US); Ryan C. DuToit, San Jose, CA (US); Kourosh Sartipi, Santa Clara, CA (US); Georgios Georgiou, San Francisco, CA (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/605,448

(22) Filed: May 25, 2017

(65) Prior Publication Data

US 2017/0343356 A1 Nov. 30, 2017

Related U.S. Application Data

(60) Provisional application No. 62/341,237, filed on May 25, 2016.

(51) Int. Cl.
*G01C 21/00* (2006.01)
*G01C 21/16* (2006.01)
(Continued)

(52) U.S. Cl.
CPC .......... *G01C 21/165* (2013.01); *G01C 21/32* (2013.01); *G06T 7/00* (2013.01); *G06T 17/005* (2013.01);
(Continued)

(58) Field of Classification Search
CPC ...... G01C 21/165; G01C 21/32; G06T 17/005
See application file for complete search history.

(56) References Cited

U.S. PATENT DOCUMENTS 5,847,755 A 12/1998 Wixson et al.
6,104,861 A 8/2000 Tsukagoshi
(Continued)

FOREIGN PATENT DOCUMENTS

WO WO 2015013418 A2 1/2015
WO WO 2015013534 A1 1/2015

OTHER PUBLICATIONS

Guo et al., "Resource-Aware Large-Scale Cooperative 3D Mapping from Multiple Cell Phones," Poster submitted to The International Robotics and Automation Conference, May 26-31, 2015, 1 pp.
(Continued)

*Primary Examiner* — Adam M Alharbi
(74) *Attorney, Agent, or Firm* — Shumaker & Sieffert, P.A.

(57) ABSTRACT

A method includes: receiving, with a computing platform, respective trajectory data and map data independently generated by each of a plurality of vision-aided inertial navigation devices (VINS devices) traversing an environment, wherein the trajectory data specifies poses along a path through the environment for the respective VINS device and the map data specifies positions of observed features within the environment as determined by an estimator executed by the respective VINS device; determining, with the computing platform and based on the respective trajectory data and map data from each of the VINS devices, estimates for relative poses within the environment by determining transformations that geometrically relate the trajectory data and the map data between one or more pairs of the VINS devices; and generating, with the computing platform and based on the transformations, a composite map specifying positions within the environment for the features observed by the VINS devices.

21 Claims, 19 Drawing Sheets

(51) Int. Cl.

| | | |
|---|---|---|
| *G06T 17/05* | (2011.01) | |
| *G06T 19/00* | (2011.01) | |
| *G06T 17/00* | (2006.01) | |
| *G06T 7/00* | (2017.01) | |
| *G01C 21/32* | (2006.01) | |
| *H04W 4/02* | (2018.01) | |

(52) U.S. Cl.
CPC ............ *G06T 17/05* (2013.01); *G06T 19/003* (2013.01); *H04W 4/026* (2013.01); *H04W 4/027* (2013.01)

(56) References Cited

U.S. PATENT DOCUMENTS

| | | | |
|---|---|---|---|
| 7,015,831 | B2 | 3/2006 | Karisson et al. |
| 7,162,338 | B2 | 1/2007 | Goncalves et al. |
| 7,991,576 | B2 | 8/2011 | Roumeliotis |
| 8,577,539 | B1 | 11/2013 | Morrison et al. |
| 8,965,682 | B2 | 2/2015 | Tangirala et al. |
| 8,996,311 | B1 | 3/2015 | Morin et al. |
| 9,031,809 | B1 | 5/2015 | Kumar et al. |
| 9,243,916 | B2 | 1/2016 | Roumeliotis et al. |
| 9,607,401 | B2 | 3/2017 | Roumeliotis et al. |
| 9,658,070 | B2 | 5/2017 | Roumeliotis et al. |
| 9,709,404 | B2 | 7/2017 | Roumeliotis et al. |
| 2002/0198632 | A1 | 12/2002 | Breed et al. |
| 2004/0073360 | A1 | 4/2004 | Foxlin |
| 2004/0167667 | A1 | 8/2004 | Goncalves et al. |
| 2005/0013583 | A1 | 1/2005 | Itoh |
| 2008/0167814 | A1 | 7/2008 | Samarasekera et al. |
| 2008/0265097 | A1 | 10/2008 | Stecko et al. |
| 2008/0279421 | A1 | 11/2008 | Hamza et al. |
| 2009/0248304 | A1 | 10/2009 | Roumeliotis et al. |
| 2010/0110187 | A1 | 5/2010 | von Flowtow et al. |
| 2010/0220176 | A1 | 9/2010 | Ziemeck et al. |
| 2012/0121161 | A1 | 5/2012 | Eade |
| 2012/0194517 | A1 | 8/2012 | Izadi et al. |
| 2013/0335562 | A1 | 12/2013 | Ramanandan et al. |
| 2014/0316698 | A1 | 10/2014 | Roumeliotis et al. |
| 2014/0333741 | A1 | 11/2014 | Roumeliotis et al. |
| 2015/0356357 | A1 | 12/2015 | McManus et al. |
| 2015/0369609 | A1 | 12/2015 | Roumeliotis et al. |
| 2016/0005164 | A1 | 1/2016 | Roumeliotis et al. |
| 2016/0161260 | A1 | 6/2016 | Mourikis |
| 2016/0305784 | A1 | 10/2016 | Roumeliotis et al. |
| 2016/0327395 | A1 | 11/2016 | Roumeliotis et al. |
| 2017/0176189 | A1* | 6/2017 | D'Aquila ............... G01C 21/12 |
| 2018/0082137 | A1* | 3/2018 | Melvin ................. G01S 13/931 |

OTHER PUBLICATIONS

Golub et al., "Matrix Multiplication Problems," Chapter 1, Matrix Computations, Third Edition, ISBN 0-8018-5413-X, 1996, (Applicant points out, in accordance with MPEP 609.04(a), that the year of publication, 1996, is sufficiently earlier than the effective U.S. filing date so that the particular month of publication is not in issue.).

"Kalman filter," Wikipedia, the Free Encyclopedia, accessed from https://en.wikipedia.org/w/index.php?title=Kalman_filter&oldid=615383582, drafted Jul. 3, 2014, 27 pp.

Thorton et al., "Triangular Covariance Factorizations for Kalman Filtering," Technical Memorandum 33-798, National Aeronautics and Space Administration, Oct. 15, 1976, 212 pp.

Shalom et al., "Estimation with Applications to Tracking and Navigation," Chapter 7, Estimation with Applications to Tracking and Navigation, ISBN 0-471-41655-X, Jul. 2001, 20 pp.

Higham, "Matrix Inversion," Chapter 14, Accuracy and Stability of Numerical Algorithms, Second Edition, ISBN 0-89871-521-0, 2002, 29 pp. (Applicant points out, in accordance with MPEP 609.04(a), that the year of publication, 2002, is sufficiently earlier than the effective U.S. filing date, so that the particular month of publication is not in issue.).

Kottas et al., "An Iterative Kalman Smoother for Robust 3D Localization and mapping," ISRR, Tech Report, Oct. 16, 2014, 15 pp.

"Project Tango," retrieved from https://www.google.com/atap/projecttango on Nov. 2, 2015, 4 pp.

Ait-Aider et al., "Simultaneous object pose and velocity computation using a single view from a rolling shutter camera," Proceedings of the IEEE European Conference on Computer Vision, May 7-13, 2006, pp. 56-68.

Ayache et al., "Maintaining Representations of the Environment of a Mobile Robot," IEEE Transactions on Robotics and Automation, vol. 5, No. 6, Dec. 1989, pp. 804-819.

Agarwal et al., "A Survey of Geodetic Approaches to Mapping and the Relationship to Graph-Based SLAM," IEEE Robotics and Automation Magazine, vol. 31, Sep. 2014, 17 pp.

Baker et al., "Removing rolling shutter wobble," Proceedings of the IEEE Conference on Computer Vision and Pattern Recognition, Jun. 13-18, 2010, 8 pp.

Bartoli et al., "Structure from Motion Using Lines: Representation, Triangulation and Bundle Adjustment," Computer Vision and Image Understanding, vol. 100, Aug. 11, 2005, pp. 416-441.

Bayard et al., "An Estimation Algorithm for Vision-Based Exploration of Small Bodies in Space," 2005 American Control Conference, Jun. 8-10, 2005, pp. 4589-4595.

Bierman, "Factorization Methods for Discrete Sequential Estimation," Mathematics in Science and Engineering, Academic Press, vol. 128, 1977, 259 pp. (Applicant points out that, in accordance with MPEP 609.04(a), the 2012 year of publication is sufficiently earlier than the effective U.S. filing date and any foreign priority date of Apr. 17, 2016 so that the particular month of publication is not in issue.).

Bouguet, "Camera Calibration Toolbox for Matlab," retrieved from http://www.vision.caltech.edu/bouguetj/calib_doc/., Oct. 14, 2015, 5 pp.

Boyd et al., "Convex Optimization," Cambridge University Press, 2004, 730 pp. (Applicant points out that, in accordance with MPEP 609.04(a), the 2004 year of publication is sufficiently earlier than the effective U.S. filing date and any foreign priority date of Apr. 17, 2016 so that the particular month of publication is not in issue.).

Breckenridge, "Interoffice Memorandum to T. K. Brown, Quaternions—Proposed Standard Conventions," I0M 343-79-1199, Oct. 31, 1979, 12 pp.

Canny, "A Computational Approach to Edge Detection," IEEE Transactions on Pattern Analysis and Machine Intelligence, vol. 8, No. 6, Nov. 1986, pp. 679-698.

Chen, "Pose Determination from Line-to-Plane Correspondences: Existence Condition and Closed-Form Solutions," Proc. 3rd. Int. Coni. Comp. Vision, Dec. 4-7, 1990, pp. 374-378.

Chiu et al., "Robust vision-aided navigation using sliding-window factor graphs," 2013 IEEE International Conference on Robotics and Automation, May 6-10, 2013, pp. 46-53.

Chiuso et al., "Structure from Motion Causally Integrated Over Time," IEEE Transactions on Pattern Analysis and Machine Intelligence, vol. 24, No. 4, Apr. 2002, pp. 523-535.

Davison et al., "Simultaneous Localisation and Map-Building Using Active Vision," Jun. 2001, 18 pp.

Deans., "Maximally Informative Statistics for Localization and Mapping", Proceedings of the 2002 IEEE International Conference on Robotics & Automation, (Washington, D.C.), May 2002, 1824-1829.

Dellaert et al., "Square Root SAM: Simultaneous Localization and Mapping via Square Root Information Smoothing," International Journal of Robotics and Research, vol. 25, No. 12, Dec. 2006, pp. 1181-1203.

Diel, "Stochastic Constraints for Vision-Aided Inertial Navigation," Massachusetts Institute of Technology, Department of Mechanical Engineering, Master Thesis, Jan. 2005, 106 pp.

Dong-Si et al., "Motion Tracking with Fixed-lag Smoothing: Algorithm and Consistency Analysis," Proceedings of the IEEE International Conference on Robotics and Automation, May 9-13, 2011, 8 pp.

(56) References Cited

OTHER PUBLICATIONS

Eade et al., "Scalable Monocular SLAM," Proceedings of the 2006 IEEE Computer Society Conference on Computer Vision and Pattern Recognition (CVPR '06), vol. 1, Jun. 17-22, 2006, 8 pp.
Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.
Eustice et al., "Exactly Sparse Delayed-slate Filters for View-based SLAM," IEEE Transactions on Robotics, vol. 22 (6), Dec. 2006, pp. 1100-1114.
Eustice et al., "Visually Navigating the RMS Titanic With Slam Information Filters," Proceedings of Robotics Science and Systems, Jun. 2005, 9 pp.
Furgale et al., "Unified temporal and spatial calibration for multi-sensor systems," Proceedings of the IEEE/RSJ International Conference on Intelligent Robots and Systems, Nov. 3-7, 2013, pp. 1280-1286.
Garcia et al., "Augmented State Kalman Filtering for AUV Navigation." Proceedings of the 2002 IEEE International Conference on Robotics & Automation, May 2002, 6 pp.
Golub et al., "Matrix Computations, Third Edition," The Johns Hopkins University Press, 2012, 723 pp. (Applicant points out that, in accordance with MPEP 609.04(a), the 2012 year of publication is sufficiently earlier than the effective U.S. filing date and any foreign priority date of Apr. 17, 2016 so that the particular month of publication is not in issue.).
Golub et al., "Matrix Computations, Fourth Edition," The Johns Hopkins University Press, 2013, 780 pp. (Applicant points out that, in accordance with MPEP 609.04(a), the 2013 year of publication is sufficiently earlier than the effective U.S. filing date and any foreign priority date of Apr. 17, 2016 so that the particular month of publication is not in issue.).
Guo et al., "Observability-constrained EKF Implementation of the IMU-RGBD Camera Navigation Using Point and Plane Features," Technical Report. University of Minnesota, Mar. 2013, 6 pp.
Guo et al., "IMU-RGBD Camera 3D Pose Estimation and Extrinsic Calibration: Observability Analysis and Consistency Improvement," Proceedings of the IEEE International Conference on Robotics and Automation, May 6-10, 2013, pp. 2920-2927.
U.S. Appl. No. 15/601,261, filed May 22, 2017, Stergios I. Roumeliotis.
Guo et al., "Efficient Visual-Inertial Navigation using a Rolling-Shutter Camera with Inaccurate Timestamps," Proceedings of Robotics: Science and Systems, Jul. 2014, 9 pp.
Harris et al., "A combined corner and edge detector," Proceedings of the Alvey Vision Conference, Aug. 31-Sep. 2, 1988, pp. 147-151.
Hermann et al., "Nonlinear Controllability and Observability," IEEE Transactions on Automatic Control, vol. 22, No. 5, Oct. 1977, pp. 728-740.
Herrera et al., "Joint Depth and Color Camera Calibration with Distortion Correction," IEEE Trans. on Pattern Analysis and Machine Intelligence, vol. 34(10), Oct. 2012, pp. 2058-2064.
Hesch et al., "Consistency analysis and improvement of vision-aided inertial navigation," IEEE Transactions on Robotics, vol. 30, No. 1, Feb. 2014, pp. 158-176.
Hesch et al., "Observability-constrained Vision-aided Inertial Navigation," University of Minnesota, Department of Computer Science and Engineering, MARS Lab, Feb. 2012, 24 pp.
Hesch et al., "Towards Consistent Vision-aided Inertial Navigation," Proceedings of the 10th International Workshop on the Algorithmic Foundations of Robotics, Jun. 13-15, 2012, 16 pp.
Horn et al., "Closed-form solution of absolute orientation using orthonormal matrices," Journal of the Optical Society of America A, vol. 5, No. 7, Jul. 1988, pp. 1127-1135.
Huang et al., "Observability-based rules for designing consistent EKF slam estimators," International Journal of Robotics Research, vol. 29, No. 5, Apr. 2010, pp. 502-528.
Huang et al., "Visual Odometry and Mapping for Autonomous Flight Using an RGB-D Camera," Proceedings of the International Symposium on Robotics Research, Aug. 28-Sep. 1, 2011, 16 pp.
Huster, "Relative Position Sensing by Fusing Monocular Vision and Inertial Rate Sensors," Stanford University, Department of Electrical Engineering, Dissertation, Jul. 2003, 158 pp.
Jia et al., "Probabilistic 3-D motion estimation for rolling shutter video rectification from visual and inertial measurements," Proceedings of the IEEE International Workshop on Multimedia Signal Processing, Sep. 2012, pp. 203-208.
Johannsson et al., "Temporally Scalable Visual Slam Using a Reduced Pose Graph," in Proceedings of the IEEE International Conference on Robotics and Automation, May 6-10, 2013, 8 pp.
Jones et al., "Visual-inertial Navigation, Mapping and Localization: A Scalable Real-time Causal Approach," International Journal of Robotics Research, vol. 30, No. 4, Mar. 31, 2011, pp. 407-430.
Kaess et al., "iSAM: Incremental Smoothing and Mapping," IEEE Transactions on Robotics, Manuscript, Sep. 7, 2008, 14 pp.
Kaess et al., "iSAM2: Incremental Smoothing and Mapping Using the Bayes Tree," International Journal of Robotics Research, vol. 31, No. 2, Feb. 2012, pp. 216-235.
Kelly et al., "A general framework for temporal calibration of multiple proprioceptive and exteroceptive sensors," Proceedings of International Symposium on Experimental Robotics, Dec. 18-21, 2010, 15 pp.
Kelly et al., "Visual-inertial sensor fusion: Localization, mapping and sensor-to-sensor self-calibration," International Journal of Robotics Research, vol. 30, No. 1, Jan. 2011, pp. 56-79.
Klein et al., "Parallel Tracking and Mapping for Small AR Workspaces," Proceedings of the IEEE and ACM International Symposium on Mixed and Augmented Reality, Nov. 13-16, 2007, pp. 225-234.
Kneip et al., "Robust Real-Time Visual Odometry with a Single Camera and an IMU," Proceedings of the British Machine Vision Conference, Aug. 29-Sep. 2, 2011, pp. 16.1-16.11.
Konolige et al., "View-based Maps," International Journal of Robotics Research, vol. 29, No. 8, Jul. 2010, 14 pp.
Konolige et al., "Efficient Sparse Pose Adjustment for 2D Mapping," Proceedings of the IEEE/RSJ International Conference on Intelligent Robots and Systems, Oct. 18-22, 2010, pp. 22-29.
Konolige et al., "FrameSLAM: From Bundle Adjustment to Real-Time Visual Mapping," IEEE Transactions on Robotics, vol. 24, No. 5, Oct. 2008, pp. 1066-1077.
Kottas et al., "An iterative Kalman smoother for robust 3D localization on mobile and wearable devices," Proceedings of the IEEE International Conference on Robotics and Automation, May 26-30, 2015, pp. 6336-6343.
Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.
Kottas et al., "Efficient and Consistent Vision-aided Inertial Navigation using Line Observations," Department of Computer Science & Engineering, University of Minnesota, MARS Lab, TR-2012-002, Sep. 2012, 14 pp.
Kottas et al., "On the Consistency of Vision-aided Inertial Navigation," Proceedings of the International Symposium on Experimental Robotics, Jun. 17-20, 2012, 15 pp.
Kummerle et al., "g2o: A General Framework for Graph Optimization," in Proceedings of the IEEE International Conference on Robotics and Automation, May 9-13, 2011, pp. 3607-3613.
Langelaan, "State Estimation for Autonomous Flight in Cluttered Environments," Stanford University, Department of Aeronautics and Astronautics, Dissertation, Mar. 2006, 128 pp.
Leutenegger et al., "Keyframe-based visual-inertial odometry using nonlinear optimization," The International Journal of Robotics Research, vol. 34, No. 3, Mar. 2015, pp. 314-334.
Li et al., "3-D Motion Estimation and Online Temporal Calibration for Camera-IMU Systems," Proceedings of the IEEE International Conference on Robotics and Automation, May 6-10, 2013, pp. 5709-5716.
Li et al., "Improving the Accuracy of EKF-based Visual-Inertial Odometry," 2012 IEEE International Conference on Robotics and Automation, May 14-18, 2012, pp. 828-835.
Li et al., "Optimization-Based Estimator Design for Vision-Aided Inertial Navigation," Proceedings of the Robotics: Science and Systems Conference, Jul. 9-13, 2012, 8 pp.

(56) References Cited

OTHER PUBLICATIONS

Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.

Li et al., "Vision-aided inertial navigation with rolling-shutter cameras," The International Journal of Robotics Research, retrieved from ijr.sagepub.com on May 22, 2015, 18 pp.

Liu et al., "Estimation of Rigid Body Motion Using Straight Line Correspondences," Computer Vision, Graphics, and Image Processing, vol. 43, No. 1, Jul. 1988, pp. 37-52.

Liu et al., "Multi-aided Inertial Navigation for Ground Vehicles in Outdoor Uneven Environments," Proceedings of the IEEE International Conference on Robotics and Automation, Apr. 18-22, 2005, pp. 4703-4708.

Kottas et al., "A Resource-aware Vision-aided Inertial Navigation System for Wearable and Portable Computers," IEEE International Conference on Robotics and Automation, Accepted Apr. 18, 2014, available online May 6, 2014, 3 pp.

Lowe, "Distinctive Image Features from Scale-Invariant Keypoints," International Journal of Computer Vision, Jan. 5, 2004, 28 pp.

Lucas et al., "An Iterative Image Registration Technique with an Application to Stereo Vision," Proceedings of the 7th International Joint Conference on Artificial Intelligence, Aug. 24-28, 1981, pp. 674-679.

Lupton et al., "Visual-inertial-aided Navigation for High-dynamic Motion in Built Environments Without Initial Conditions," IEEE Transactions on Robotics, vol. 28, No. 1, Feb. 2012, pp. 61-76.

Martinelli, "Vision and IMU Data Fusion: Closed-form Solutions for Attitude, Speed, Absolute Scale, and Bias Determination," IEEE Transactions on Robotics, vol. 28, No. 1, Feb. 2012, pp. 44-60.

Matas et al., "Robust Detection of Lines Using the Progressive Probabilistic Hough Transformation," Computer Vision and Image Understanding, vol. 78, No. 1, Apr. 2000, pp. 119-137.

McLauchlan, "The Variable State Dimension Filter Applied to Surface-Based Structure from Motion CVSSP Technical Report VSSP-TR-4/99," University of Surrey, Department of Electrical Engineering, Dec. 1999, 52 pp.

Meltzer et al., "Edge Descriptors for Robust Wide-baseline Correspondence," Proc. IEEE Conf. Comp. Vision Pall. Recognition., Jun. 23-28, 2008, pp. 1-8.

Mirzaei et al., "A Kalman Filter-based Algorithm for IMU-Camera Calibration: Observability Analysis and Performance Evaluation," IEEE Trans. Robot., vol. 24 No. 5, Oct. 2008, pp. 1143-1156.

Mirzaei et al., "Optimal Estimation of Vanishing Points in a Manhattan World," IEEE Int. Conference on Computer Vision, Nov. 6-13, 2011, pp. 2454-2461.

Mirzaei et al., "Globally Optimal Pose Estimation from Line Correspondences," IEEE International Conference on Robotics and Automation, May 9-13, 2011, pp. 5581-5588.

Montiel et al., "Unified Inverse Depth Parametrization for Monocular SLAM," Proceedings of Robotics: Science and Systems II (RSS-06), Aug. 16-19, 2006, 8 pp.

Mourikis et al., "On the Treatment of Relative-Pose Measurements for Mobile Robot Localization," IEEE International Conference on Robotics and Automation, Conference Date May 15-19, 2006, Jun. 26, 2006, 8 pp.

Mourikis et al., "A Dual-Layer Estimator Architecture for Long-term Localization," Proceedings of the Workshop on Visual Localization for Mobile Platforms, Jun. 24-26, 2008, 8 pp.

Mourikis et al., "A Multi-State Constraint Kalman Filter for Vision-aided Inertial Navigation," IEEE International Conference on Robotics and Automation, Apr. 10-14, 2007, pp. 3565-3572.

Mourikis et al., "A Multi-State Constraint Kalman Filter for Vision-aided Inertial Navigation," IEEE International Conference on Robotics and Automation, Sep. 28, 2006, 20 pp.

Mourikis et al., "Vision-Aided Inertial Navigation for Spacecraft Entry, Descent, and Landing," IEEE Transactions on Robotics, vol. 25, No. 2, Apr. 2009, pp. 264-280.

Nerurkar et al., "C-KLAM: Constrained Keyframe-Based Localization and Mapping," Proceedings of the IEEE International Conference on Robotics and Automation, May 31-Jun. 7, 2014, 6 pp.

Nister et al., "Visual Odometry for Ground Vehicle Applications," Journal of Field Robotics, vol. 23, No. 1, Jan. 2006, 35 pp.

Oliensis, "A New Structure from Motion Ambiguity," IEEE Transactions on Pattern Analysis and Machine Intelligence, vol. 22, No. 7, Jul. 2000, 30 pp.

Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filing date and any foreign priority date of Apr. 17, 2016 so that the particular month of publication is not in issue.).

Oth et al., "Rolling shutter camera calibration," Proceedings of the IEEE Conference on Computer Vision and Pattern Recognition, Jun. 23-28, 2013, pp. 1360-1367.

Prazenica et al., "Vision-Based Kalman Filtering for Aircraft State Estimation and Structure from Motion," AIAA Guidance, Navigation, and Control Conference and Exhibit, Aug. 15-18, 2005, 13 pp.

Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filing date and any foreign priority date of Apr. 17, 2016 so that the particular month of publication is not in issue.).

Roumeliotis et al., "Stochastic Cloning: A Generalized Framework for Processing Relative State Measurements," Proceedings of the 2002 IEEE International Conference on Robotics and Automation, May 11-15, 2002, pp. 1788-1795.

Schmid et al., "Automatic Line Matching Across Views," Proceedings of the IEEE Computer Science Conference on Computer Vision and Pattern Recognition, Jun. 17-19, 1997, pp. 666-671.

Servant et al., "Improving Monocular Plane-based SLAM with Inertial Measurements," 2010 IEEE/RSJ International Conference on Intelligent Robots and Systems, Oct. 18-22, 2010, pp. 3810-3815.

Shoemake et al., "Animating rotation with quaternion curves," ACM SIGGRAPH Computer Graphics, vol. 19, No. 3, Jul. 22-26, 1985, pp. 245-254.

Sibley et al., "Sliding Window Filter with Application to Planetary Landing," Journal of Field Robotics, vol. 27, No. 5, Sep./Oct. 2010, pp. 587-608.

Smith et al., "On the Representation and Estimation of Spatial Uncertainty," International Journal of Robotics Research, vol. 5(4), 1986, pp. 56-68 (Note: Applicant points out in accordance with MPEP 609.04(a) that the 1986 year of publication is sufficiently earlier than the effective U.S. filing date and any foreign priority date of Apr. 17, 2016 so that the particular month of publication is not in issue.).

Smith et al., "Real-time Monocular Slam with Straight Lines," British Machine vision Conference, vol. 1, Sep. 2006, pp. 17-26.

Soatto et al., "Motion Estimation via Dynamic Vision," IEEE Transactions on Automatic Control, vol. 41, No. 3, Mar. 1996, pp. 393-413.

Soatto et al., "Recursive 3-D Visual Motion Estimation Using Subspace Constraints," International Journal of Computer Vision, vol. 22, No. 3, Mar. 1997, pp. 235-259.

Spetsakis et al., "Structure from Motion Using Line Correspondences," International Journal of Computer Vision, vol. 4, No. 3), Jun. 1990, pp. 171-183.

Strelow, D. W., "Motion Estimation from Image and Inertial Measurements", CMU-CS-04-174, (Nov. 2004), 164 pgs.

Taylor et al., "Structure and Motion from Line Segments in Multiple Images," IEEE Transactions on Pattern Analysis and Machine Intelligence, vol. 17, No. 11, Nov. 1995, pp. 1021-1032.

(56) References Cited

OTHER PUBLICATIONS

Trawny et al., "Indirect Kalman Filter for 3D Attitude Estimation," University of Minnesota, Department of Computer Science & Engineering, MARS Lab, Mar. 2005, 25 pp.

Triggs et al., "Bundle Adjustment—A Modern Synthesis," Proceedings of the International Workshop on Vision Algorithms: Theory and Practice, Lecture Notes in Computer Science, vol. 1883, Sep. 21-22, 1999, pp. 298-372.

Triggs et al., "Bundle Adjustment—A Modern Synthesis," Vision Algorithms: Theory & Practice, LNCS 1883, Apr. 12, 2002, 71 pp.

Weiss et al., "Real-time Metric State Estimation for Modular Vision-Inertial Systems," Proceedings of the IEEE International Conference on Robotics and Automation, May 9-13, 2011, pp. 4531-4537.

Weiss et al., "Versatile Distributed Pose Estimation and sensor Self-Calibration for an Autonomous MAV," Proceedings of IEEE International Conference on Robotics and Automations, May 14-18, 2012, pp. 31-38.

Weng et al., "Motion and Structure from Line Correspondences: Closed-Form Solution, Uniqueness, and Optimization," IEEE Transactions on Pattern Analysis and Machine Intelligence, vol. 14, No. 3, Mar. 1992, pp. 318-336.

Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.

Zhou et al., "Determining 3d Relative Transformations for any Combination of Range and Bearing Measurements," IEEE Trans. on Robotics, vol. 29 No. 2, Apr. 2013, pp. 458-474.

Kottas et al., "An Iterative Kalman Smoother for Robust 3D Localization on Mobile and Wearable devices," Submitted confidentially to International Conference on Robotics & Automation, ICRA '15, May 5, 2015, 8 pp.

Weiss et al., "Real-time Onboard Visual-inertial State Estimation and Self-calibration of MAVs in Unknown Environment," Proceedings of the IEEE International Conference on Robotics and Automation, May 14-18, 2012, 957-964 pp.

Perea et al., "Sliding Windows and Persistence: An Application of Topological Methods to Signal Analysis," Foundations of Computational Mathematics, Nov. 25, 2013, 34 pp.

U.S. Appl. No. 15/470,595, filed Mar. 27, 2017, by Stergios I. Roumeliotis.

U.S. Appl. No. 15/706,149, filed Sep. 15, 2015, Stergios I. Roumeliotis.

\* cited by examiner

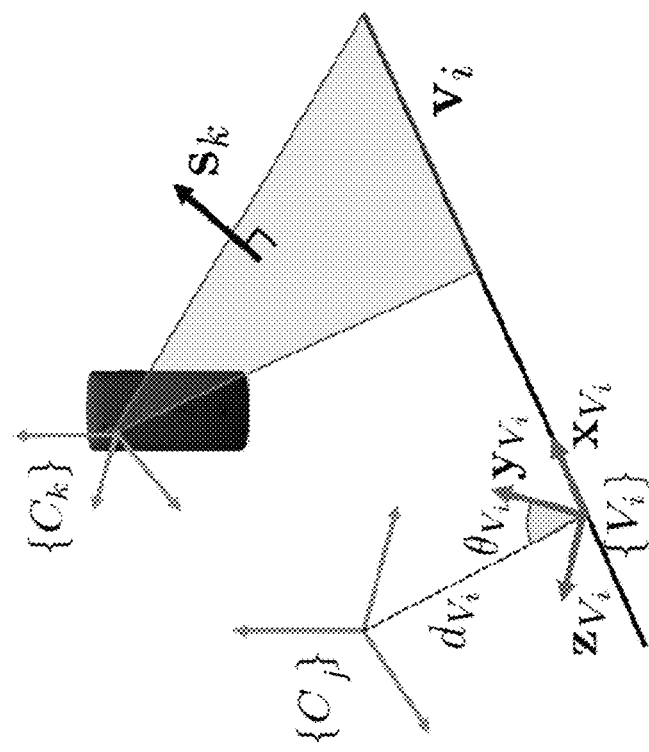
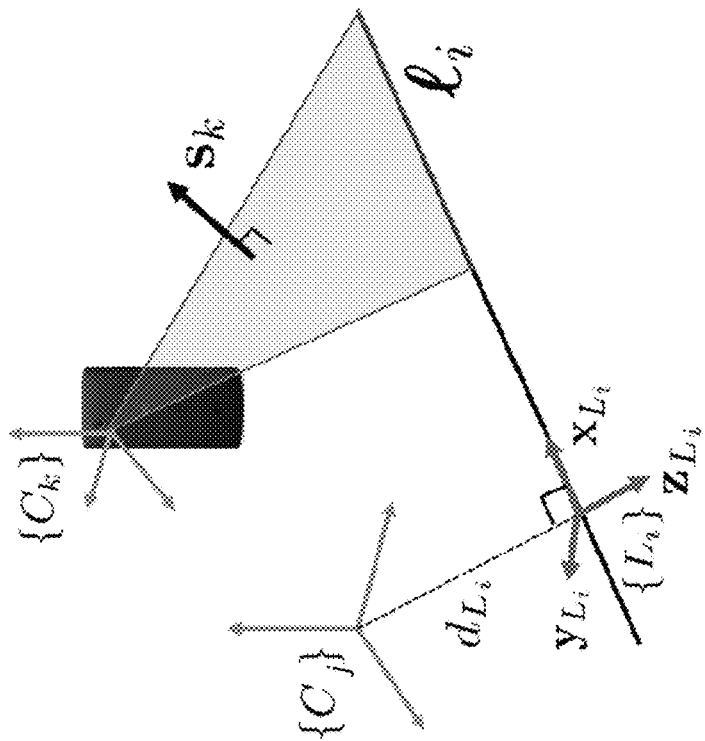
FIG. 5

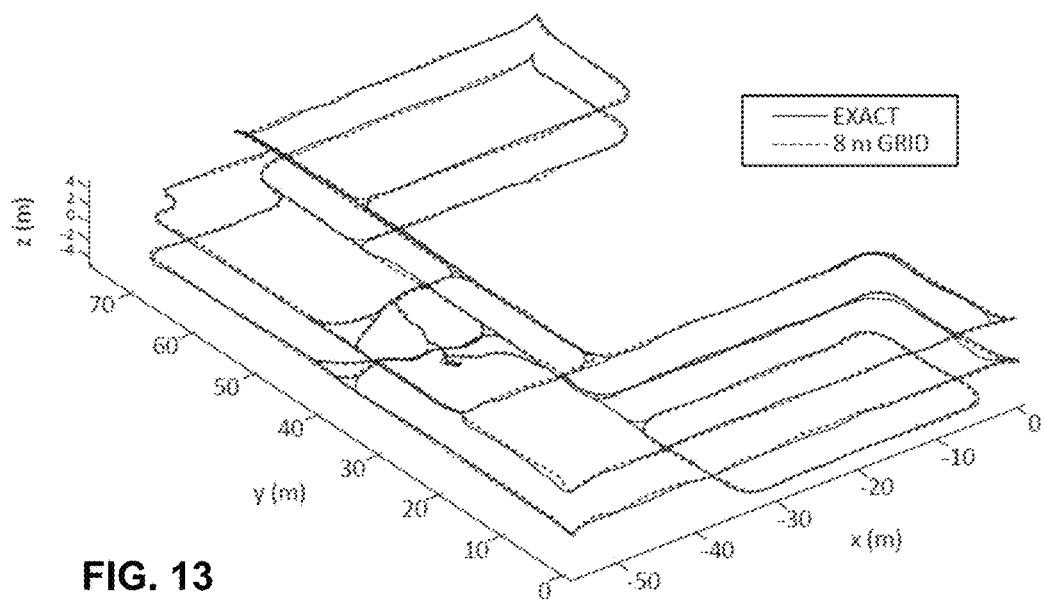
FIG. 13
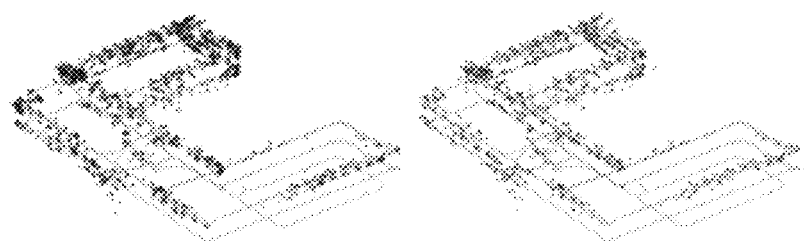
FIG. 14A  FIG. 14B
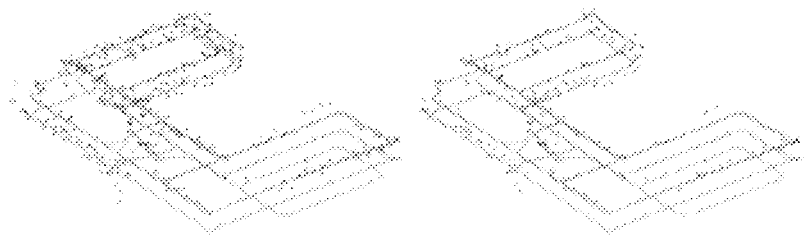
FIG. 14C  FIG. 14D

RESOURCE-AWARE LARGE-SCALE COOPERATIVE 3D MAPPING USING MULTIPLE MOBILE DEVICES

This application claims the benefit of U.S. Provisional Application No. 62/341,237 by Roumeliotis, entitled, "RESOURCE-AWARE LARGE-SCALE COOPERATIVE 3D MAPPING USING MULTIPLE MOBILE DEVICES" and filed on May 25, 2016, the entire content of which is incorporated herein by reference.

TECHNICAL FIELD

This disclosure relates to navigation and, more particularly, to vision-aided inertial navigation.

BACKGROUND

In general, a Vision-aided Inertial Navigation System (VINS) fuses data from a camera and an Inertial Measurement Unit (IMU) to track the six-degrees-of-freedom (d.o.f) position and orientation (pose) of a sensing platform through an environment. In this way, the VINS combines complementary sensing capabilities. For example, an IMU can accurately track dynamic motions over short time durations, while visual data can be used to estimate the pose displacement (up to scale) between consecutive views. For several reasons, VINS has gained popularity to address GPS-denied navigation. During the past decade, VINS have been successfully applied to robots, spacecraft, automotive, and personal localization (e.g., by use of smartphones or laptops), demonstrating real-time performance.

Creating an accurate 3D map within a GPS denied area is required in many applications, such as human (or robot) indoor navigation and localization, augmented reality, and search and rescue. However, creating a complex map with a single mobile device, such as a mobile phone, tablet or wearable computer, presents certain challenges. For example, the device used for recording data may not have sufficient resources (e.g., storage space or battery) to collect data covering a large area. Additionally, it may not be convenient for a single user to navigate the whole building at once. Furthermore, anytime a portion of the map changes (e.g., due to lighting conditions and building reformations), or is deemed of insufficient quality or accuracy, the mapping process must be repeated.

SUMMARY

In general, this disclosure describes techniques for enhanced, large-scale mapping of a 3D environment using multiple, cooperative mobile devices. In some cases, the cooperative mapping techniques described herein may be applied to process visual and inertial data collected from multiple users at different times. Moreover, the cooperative mapping techniques described herein may be applied even where transformation between the users' starting positions and orientations (poses) are not known.

In other words, the example technical solutions described herein may address the problem of cooperative mapping (CM) using datasets collected by multiple users at different times, when the transformation between the users' starting poses is unknown. As examples, CM solutions are described that formulate CM as a constrained optimization problem, where each user's independently estimated trajectory and map are merged together by imposing geometric constraints between commonly-observed point and line features. Additionally, the solutions may efficiently solve the CM problem, by taking advantage of its structure. The proposed technical solutions and implementations are proven, in examples, to be batch-least-squares (BLS) optimal over all users' data-sets, while it is less memory demanding and lends itself to parallel implementations. In particular, the solutions are shown to be faster than a standard BLS solution, when the overlap between the users' data is small. Furthermore, resource-aware implementations are described that are enabled to consistently trade accuracy for lower processing cost, by retaining only an informative subset of the common-feature constraints.

In one example, the techniques of the disclosure describe a method including: receiving, with a computing platform having one or more hardware-based processors, respective trajectory data and map data independently generated by each of a plurality of vision-aided inertial navigation devices (VINS devices) traversing an environment, wherein the trajectory data specifies poses along a path through the environment for the respective VINS device and the map data specifies positions of observed features within the environment as determined by an estimator executed by the respective VINS device; determining, with the computing platform and based on the respective trajectory data and map data from each of the VINS devices, estimates for relative poses within the environment by determining transformations that geometrically relate the trajectory data and the map data between one or more pairs of the VINS devices; and generating, with the computing platform and based on the transformations, a composite map that specifies positions within the environment for the features observed by any of the VINS devices.

In another example, the techniques of the disclosure describes a vision-aided inertial navigation system including: a plurality of mobile devices, each of the mobile devices including: at least one image source to produce image data along a trajectory of the mobile device within an environment, wherein the image data contains a plurality of features observed within the environment at a plurality of poses of the mobile device along the trajectory; an inertial measurement unit (IMU) to produce IMU data indicative of motion of the vision-aided inertial navigation system; and a hardware-based processing unit including an estimator that determines, based on the image data and the IMU data, trajectory data specifying a position and orientation of the mobile device for a plurality of poses of the mobile device along the trajectory and map data specifying positions with the environment for features observed from the poses; and a cooperative mapping server configured to: receive respective trajectory data and map data independently generated by each of mobile devices; determine transformations that geometrically relate the trajectory data and the map data between one or more pairs of the mobile devices; and generating, with the computing platform and based on the transformations, a composite map that specifies positions within the environment for the features observed by any of the mobile devices.

In another example, the techniques of the disclosure describe a non-transitory computer-readable medium including instructions that, when executed, cause one or more hardware-based processors of a computing platform to: receive respective trajectory data and map data independently generated by each of a plurality of vision-aided inertial navigation devices (VINS devices) traversing an environment, wherein the trajectory data specifies poses along a path through the environment for the respective VINS device and the map data specifies positions of observed features within the environment as determined by an estimator executed by the respective VINS device; determine, based on the respective trajectory data and map data from each of the VINS devices, estimates for relative poses within the environment by determining transformations that geometrically relate the trajectory data and the map data between one or more pairs of the VINS devices; and generate, based on the transformations, a composite map that specifies positions within the environment for the features observed by any of the VINS devices.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 illustrates the parameterization and measurement of free lines and Manhattan lines, in accordance with the techniques of the disclosure.

FIG. 13 illustrates trajectories estimated from original CM and sparse CM with common-feature sparsification using a grid, in accordance with the techniques of the disclosure.

FIGS. 14A-14D illustrate example common point features before and after sparsification using grids of different sizes, in accordance with the techniques of the disclosure.

Like reference characters refer to like elements throughout the figures and description.

DETAILED DESCRIPTION

The cooperative mapping (CM) techniques described herein provide technical solutions that take advantage of the problem structure to achieve certain technical benefits and improvements, and may utilize both consecutive and loop-closure observations of point and line features to achieve high accuracy. For example, in example implementations, CM is formulated as a constrained optimization problem, in which the cost function is expressed as the sum of the cost functions from all users, while the constraints express the geometric relationship between the features commonly observed by two or more users. Based on these formulations and approaches, technical solutions having technical improvements over conventional systems are described.

In one example, CM techniques are described that are modular (i.e., maps or submaps can be easily and efficiently added or removed), lend themselves to parallel implementation, and are more memory efficient than conventional techniques within the same technological field. In addition, the proposed technical solutions leverage each individual user's intermediate mapping results to reduce the processing cost. Moreover, the described CM techniques and implementations described herein allow for consistently trading estimation accuracy with computational-cost savings by appropriately reducing the commonly-observed-feature constraints to a number that can be analytically determined. In addition, example implementations of the described CM techniques may utilize points, "free lines" (lines not aligned with the cardinal directions of the building), and "Manhattan lines" to improve the estimation accuracy. Additionally, the described CM techniques provide robust methods for detecting and applying loop-closure line measurements in a visual-inertial mapping system. As described herein, the described CM techniques have been validated in large-scale 3D experiments using datasets collected from multiple mobile devices.

Figure 1:
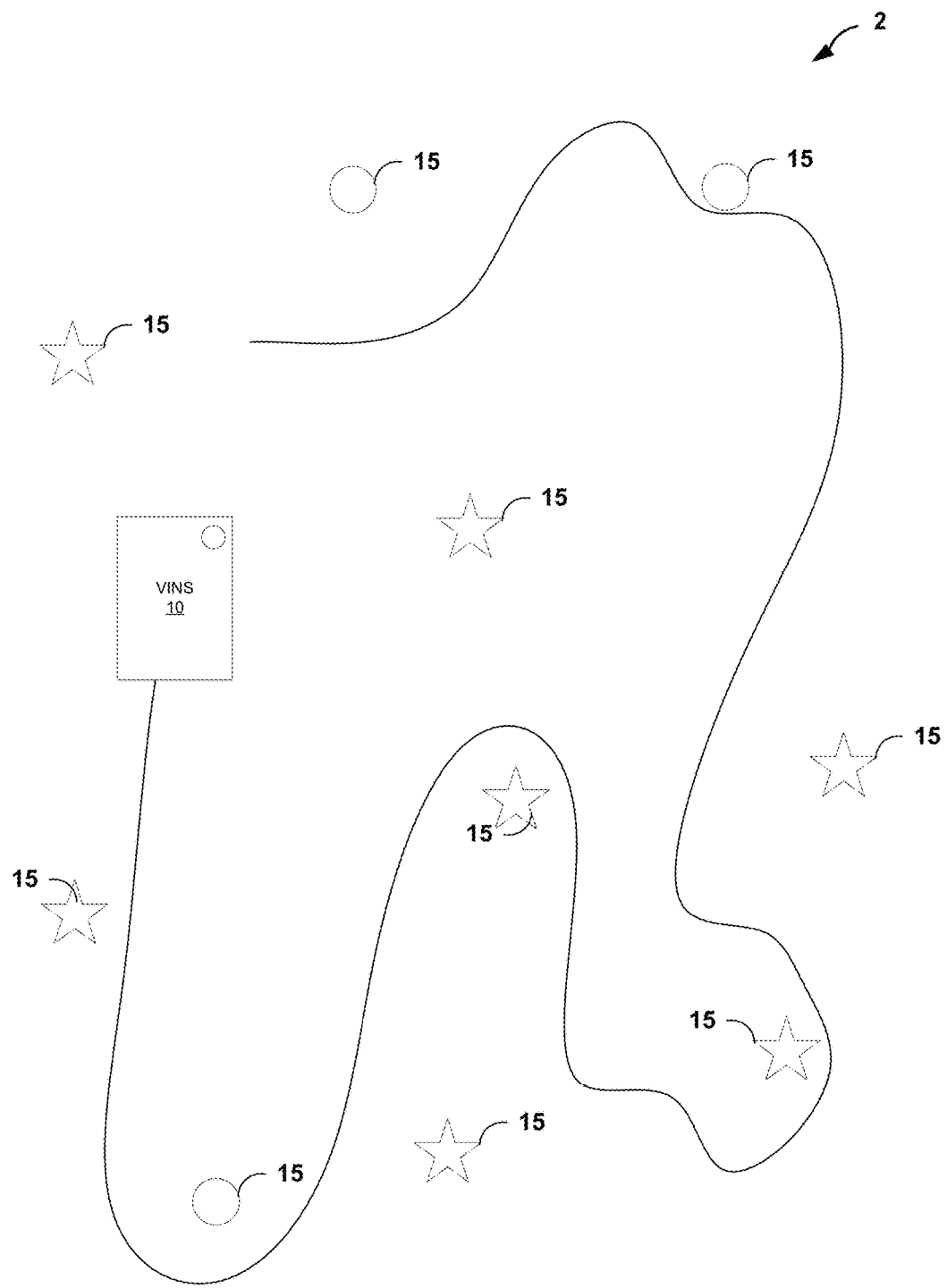
FIG. 1 is a block diagram illustrating a vision-aided inertial navigation system (VINS) that navigates an environment having a plurality of features using one or more image sources and inertial measurement unit (IMUs) in accordance with the techniques of the disclosure.

FIG. 1 is a block diagram illustrating a vision-aided inertial navigation system (VINS) 10 that navigates an environment 2 having a plurality of features 15 using one or more image sources and inertial measurement unit (IMUs). That is, VINS 10 is one example of a device that utilizes a 3D map of environment 2 to determine the position and orientation of VINS 10 as the VINS traverses the environment, where the map may be constructed in real-time by the VINS or previously constructed. Environment 2 may, for example, represent an environment where conventional GPS-signals are unavailable for navigation, such as on the moon or a different planet or even underwater. As additional examples, environment 2 may represent an indoors environment such as the interior of a building, such as a convention center, shopping mall, sporting arena, business office and the like. Features 15, also referred to as landmarks, represent objects visible within environment 2, such as rocks, trees, signs, walls, stairs, chairs, tables, and the like. Features 15 may be moving or stationary objects within environment 2.

VINS 10 represents any mobile device that implements the techniques described herein. VINS 10 may be, for example, a robot, mobile sensing platform, a mobile phone, a laptop, a tablet computer, a vehicle, an unmanned aircraft system (UAS) such as a drone, and the like. The increasing range of sensing capabilities offered by modern mobile devices, such as cell phones and tables, as well as their increasing computational resources make them ideal for applying VINS. In some implementations, the techniques described herein may be used within environments having GPS or similar signals and may provide supplemental localization and mapping information.

For purposes of example, VINS 10 is shown as an autonomous robot although, as discussed above, VINS 10 may take the form of other devices that implement the techniques described herein. While traversing environment 2, the image sources of VINS 10 produce image data at discrete time instances along the trajectory within the three-dimensional (3D) environment, where the image data captures features 15 within the 3D environment at each of the time instances. In addition, IMUs of VINS 10 produces IMU data indicative of a dynamic motion of VINS 10.

As described in detail herein, VINS 10 includes a hardware-based computing platform that implements an estimator that fuses the image data and the IMU data to perform localization of VINS 10 within environment 10. Estimator 22 process image data 14 and IMU data 18 to estimate the 3D IMU pose and velocity together with the time-varying IMU biases, camera rolling shutter and IMU-camera time synchronization and to produce, based on the captured image data, estimates for poses of VINS 10 along the trajectory and, in some cases, a position and orientation within an overall map of the environment, where the map may be constructed using the cooperative mapping techniques described herein. Utilizing these techniques, VINS 10 may navigate environment 2 and, in some cases, may construct or augment the mapping information for the environment including the positions of features 15.

The estimator of VINS 10 may operate according to different types of estimators. For example, in an example implementation, VINS 10 implements as described in U.S. Pat. No. 9,243,916, the entire contents of which are incorporated herein. VINS 10 implements an inverse, sliding-window filter (ISWF) as described in U.S. patent application Ser. 14/796,574, filed Jul. 10, 2015, entitled "INVERSE SLIDING-WINDOW FILTERS FOR VISION-AIDED INERTIAL NAVIGATION SYSTEMS," the entire contents of which is incorporated herein by reference. In other examples, VINS 10 implements a sliding-window Iterative Kalman Smoother (IKS) as described U.S. patent application Ser. 15/130,736, filed Apr. 15, 2016, entitled "ITERATIVE KALMAN SMOOTHER FOR ROBUST 3D LOCALIZATION FOR VISION-AIDED INERTIAL NAVIGATION," the entire contents of which are incorporated herein.

Figure 2:
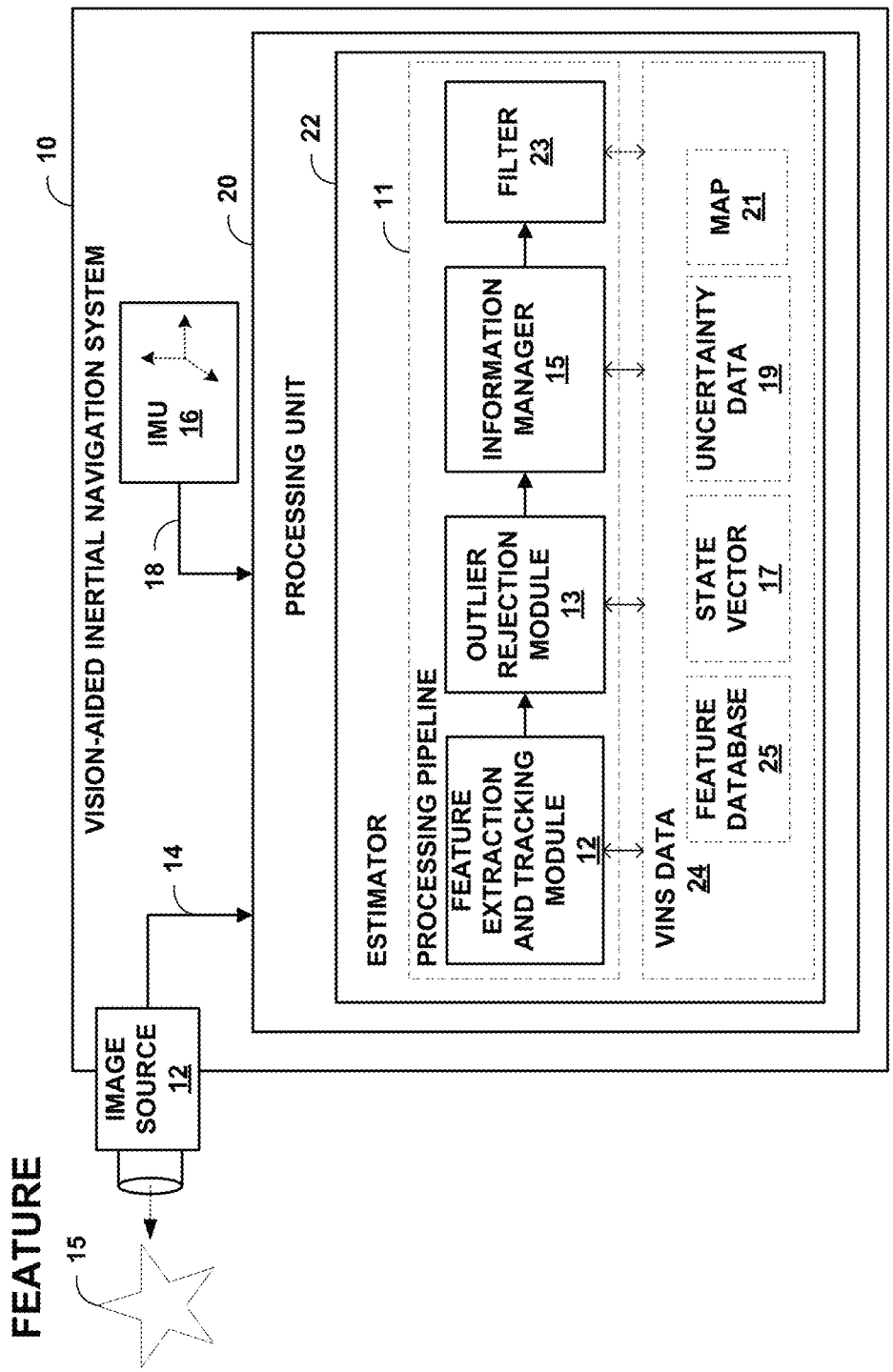
FIG. 2 illustrates an example implementation of the VINS of FIG. 1 in further detail, in accordance with the techniques of the disclosure.

FIG. 2 illustrates an example implementation of VINS 10 in further detail. Image source 12 of VINS 10 images an environment in which VINS 10 operates so as to produce image data 14. That is, image source 12 generates image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system or a vision system having multiple cameras to produce 3D information, a Doppler radar and the like. In this way, image data 14 provides exteroceptive information as to the external environment in which VINS 10 operates. Moreover, image source 12 may capture and produce image data 14 at time intervals in accordance one or more clocks associated with the image source. In other words, image source 12 may produce image data 14 at each of a first set of time instances along a trajectory within the three-dimensional (3D) environment, wherein the image data captures features 15 within the 3D environment at each of the first time instances.

IMU 16 produces IMU data 18 indicative of a dynamic motion of VINS 10. IMU 16 may, for example, detect a current acceleration using one or more accelerometers as VINS 10 is translated, and detect the rotational velocity (i.e., the rate of change in rotational attributes like pitch, roll and yaw) using one or more gyroscopes as VINS 10 is rotated. IMU 14 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In such cases, VINS 10 may compensate and correct for any misalignment by applying the techniques described in U.S. patent application Ser. No. 14/733,468, entitled "EFFICIENT VISION-AIDED INERTIAL NAVIGATION USING A ROLLING-SHUTTER CAMERA WITH INACCURATE TIMESTAMPS," incorporated herein by reference.

In general, estimator 22 fuses image data 14 and IMU data 18 to determine a position and orientation of VINS 10 as well as positions of features 15 as the VINS traverses environment 2. That is, estimator 22 of processing unit 20 process image data 14 and IMU data 18 to compute state estimates for the various degrees of freedom of VINS 10 and, from the state estimates, computes position, orientation, speed, locations of observable features, a map to be used for localization, an odometry or other higher order derivative information represented by VINS data 24. Processing unit 20 may, for example, comprise a hardware-based computing platform having one or more processors that execute software instructions and/or application-specific hardware for implementing the techniques described herein.

In the example of FIG. 2, estimator 22 comprises a processing pipeline 11 for measurements from image source 12 and IMU 16. In this example, processing pipeline 11 includes feature extraction and tracking module 12, outlier rejection module 13, information manager 15 and filter 23.

Feature extraction and tracking module 12 extracts features 15 from image data 14 acquired by image source 12 and stores information describing the features in feature database 25. Feature extraction and tracking module 12 may, for example, perform corner and edge detection to identify features and track features 15 across images using, for example, the Kanade-Lucas-Tomasi (KLT) techniques described in Bruce D. Lucas and Takeo Kanade, *An iterative image registration technique with an application to stereo vision*, In Proc. of the International Joint Conference on Artificial Intelligence, pages 674-679, Vancouver, British Columbia, Aug. 24-28 1981, the entire content of which in incorporated herein by reference.

Outlier rejection module 13 provides robust outlier rejection of measurements from image source 12 and IMU 16. For example, outlier rejection module may apply a Mahalanobis distance tests to the feature measurements to identify and reject outliers. As one example, outlier rejection module 13 may apply a 2-Point Random sample consensus (RANSAC) technique described in Laurent Kneip, Margarita Chli, and Roland Siegwart, *Robust Real-Time Visual Odometry with a Single Camera and an IMU*, In Proc. of the British Machine Vision Conference, pages 16.1-16.11, Dundee, Scotland, Aug. 29-Sep. 2 2011, the entire content of which in incorporated herein by reference.

Information manager 15 selects features from feature database 15 and feeds measurements for the selected features to filer 23, which may perform simultaneous localization of the position and orientation for VINS 10 within environment 2 by iteratively optimizing over measurements throughout trajectory, which can be computationally extensive. As described herein, estimator 22 implements filter 23 that iteratively updates predicted state estimates over a bounded-size sliding window of state estimates for poses of VINS 10 and positions of features 15 in real-time as new image data 14 and IMU data 18 are obtained. That is, by implementing the filtering approach, estimator 22 of VINS 10 marginalizes out past state estimates and measurements through the sliding window as VINS 10 traverses environment 2 for simultaneous localization and mapping (SLAM).

In one example implementation, filter 23 of estimator 22 recursively operates on the streams of image data 14 and IMU data 18 to compute a sliding window of predicted estimates for the state variables maintained within state vector 17 along with uncertainty data 19 representing the respective uncertainties in the form of one or more uncertainty matrices, which may take the form of covariance matrices for an extended Kalman filter (EKF). For example, at any time instant, the EKF state 17 vector comprises the evolving IMU state and a history of up to $N_{max}$ past poses of the camera state vector 17 and may take the form of:

$$x = [x_I \; x_{I_{k+n-1}} \ldots x_{I_k}]$$

where $x_I$ denotes the current pose, and $x_{I_i}$ for I= k+n−1, . . . , k are the IMU poses in the sliding window, corresponding to the time instants of the last n camera measurements. The current robot pose may be defined as:

$$x_I = [{}^I q_G{}^T \; {}^G v_I{}^T \; {}^G p_I{}^T \; b_a{}^T \; b_g{}^T \; \lambda_d \; \lambda_r]^T$$

where ${}^I q_G$ is the quaternion representation of the orientation of $\{G\}$ in the IMU's frame of reference $\{I\}$, ${}^G v_I$ and ${}^G p_I$ are the velocity and position of $\{I\}$ in $\{G\}$ respectively, while $b_a$ and $b_g$ correspond to gyroscope and accelerometer biases.

Estimator 22 may implement filter 23 such that uncertainty data 19 takes the form of a matrix that contains estimates of the uncertainty of each predicted state estimate in state vector 17 as well as a correlation between uncertainties. When a subsequent measurement is observed from either image data 14 or IMU data 18, filter 23 updates the sliding window of predicted state estimates with state vector 17 and the uncertainty data 19 as described herein so as to operate as an iterative Kalman smoother. In general, estimator 22 operates in real-time using the present input measurements of image data 14 and IMU data 18 and the previously calculated state estimates and its uncertainty matrix. In general, when new image data 14 or IMU data 18 is received, filter 23 projects the measurements as the data arrives onto the state estimates within state vector 17 to re-compute the predicted states and to update respective uncertainty data 19 for each state estimate. Any difference between the predicted state estimates as computed by estimator 22 and the actual feature measurements is referred to as a residual.

In some examples, estimator 22 iteratively processes measurements from image data 14 and IMU data 18 to update estimates only keyframes (key robot/device poses) and key landmarks while also exploiting information (e.g., visual observations and odometry measurements) available to the non-keyframes along the trajectory. In such example implementations, filter 23 projects new measurements onto the keyframes, by generating consistent pose (position and orientation) constraints between keyframes. As used herein, the term keyframes refers to the individual poses of the VINS 10 for which position and orientation of the VINS are to be estimated. In contrast, the term non-keyframes refers to intermediate poses between keyframes and for which, in some examples, complete state estimates of the VINS are not computed. In these example implementations, information from non-keyframes, acquired between keyframes, is not discarded. Instead, this information is projected on to estimates in the state vector associated with the keyframes, in order to generate tight constraints between the keyframes. For example, information from a non-keyframe may be projected onto a preceding keyframe to compute relative position and orientation constraints between the preceding keyframe and the non-keyframe. Further examples of such implementations are described in U.S. patent application Ser. 14/271,971, entitled "CONSTRAINED KEY FRAME LOCALIZATION AND MAPPING FOR VISION-AIDED INERTIAL NAVIGATION," filed May 7, 2014, the entire contents of which are incorporated herein by reference.

Estimator 22 processes inertial and visual measurements to compute, based on the image data and the IMU data, state estimates for at least a position and orientation of VINS 10 for a plurality of poses of the VINS along the trajectory. That is, estimator 22 process image data 14 and IMU data 18 to update within state vector 17 estimates for the 3D IMU pose and velocity together with the time-varying IMU biases so as to determining the position and orientation of estimator 22 within the environment represented by map 21, where the map may be initially constructed using the cooperative mapping information described herein. Estimator 22 may, in accordance with the techniques described herein, apply estimation techniques that compute state estimates for 3D poses of IMU 16 at each of the first set of time instances associated with capture of the IMU data and 3D poses of image source 12 at each of the second set of time instances associated with capture of the image data along the trajectory.

In this example implementation, VINS 10 provides two sources of information: motion information (IMU data 18) from an IMU 14, and image data 14 (e.g., feature observations) from image source 12. Estimator 22 may classify the features observations into two main categories: simultaneous localization and mapping (SLAM) features for which estimates are included and updated within a complex system state vector 17 maintained by estimator 22, and multi-state constraint Kalman filter (MSCKF) features for which the estimator has determined to exclude corresponding estimates in the state vector but instead used the features to generate constraints that geometrically constrain the states for the poses of VINS 10 from which the MSCKF feature was observed. That is, rather than maintain state estimates for positions of each observed feature 15 within its internal state vector, the estimator may group the images per feature and elect to exclude state estimates for one or more of those features (i.e., MSCKF features) from its state vector that were observed from multiple poses along the trajectory. For these features excluded from the state vector, referred to as MSCKF features, estimator 22 computes geometric constraints that constrain state estimates for other poses within the sliding window state vector and that are used to compute state updates for those state estimates within the state vector. In this way, MSCKF features relate and constrain estimated poses within the sliding window. They require less computations than SLAM features since their feature states are not directly estimated. Further example details of an estimator that computes constraints for features 15 observed from multiple poses and utilizes constraints to compute the state estimates for VINS 10 while excluding the MSCKF features from the state vector are described in U.S. patent application Ser. No. 12/383,371, entitled "VISION-AIDED INERTIAL NAVIGATION," the entire contents of which are incorporated herein by reference.

Cooperative mapping techniques are described herein for creating an accurate 3D map of an environment, including locations of features within the environment, for use with VINS navigation and localization, such as by VINS 10 of FIGS. 1 and 2. This disclosure describes techniques for enhanced, large-scale mapping of a 3D environment using multiple, cooperative mobile devices. In some cases, the cooperative mapping techniques described herein may be applied to process visual and inertial data collected from multiple users at different times. Moreover, the cooperative mapping techniques described herein may be applied event where transformation between the users' starting positions and orientations (poses) are not known.

Figure 3:
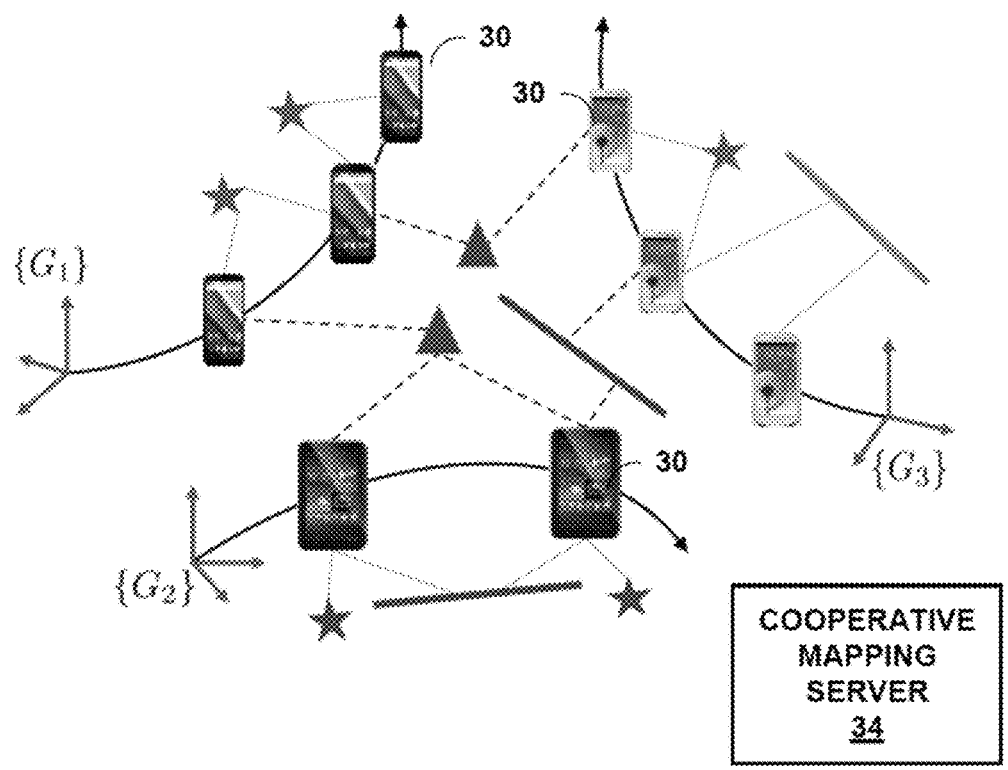
FIG. 3 illustrates an environment including Non-common (stars) and common (triangles) point features, as well as line features observed by mobile devices, in accordance with the techniques of the disclosure.

FIG. 3 illustrates an environment including Non-common (stars) and common (triangles) point features, as well as line features observed by mobile devices 30. Consider multiple datasets consisting of visual and inertial measurements collected by several users with respective mobile devices 30 each having a camera and an IMU. We examine the most general case, where the relative transformations of the users are unknown, and no relative-pose measurements between them are provided. Furthermore, we assume that there exist enough (two or more) common point features between pairs of users to determine the transformation between all maps. Such a multi-user CM scenario is illustrated in FIG. 3.

Figure 4:
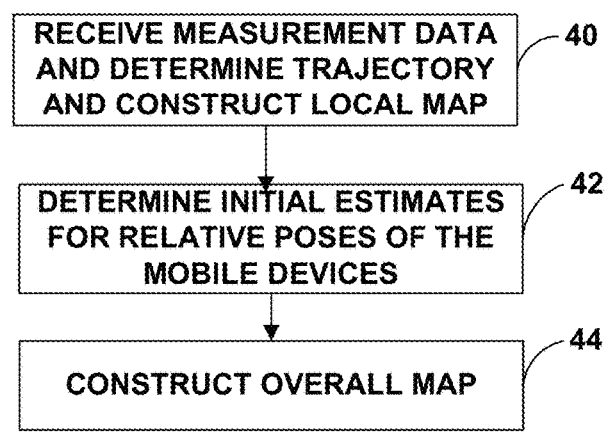
FIG. 4 is a flowchart illustrating an example operation in accordance with the techniques of the disclosure.

Techniques described herein determine a BLS solution over all users' trajectories and maps. FIG. 4 is a flowchart illustrating an example operation of the technique:

1) Initially, a BLS solution for each individual user's trajectory and map is determined independently, using measurements from only their dataset (step 40). During this step, each mobile device captures measurement data, determines its respective trajectory and constructs its own local map.

2) Next, an initial estimate of the users' relative poses, using their observations of common point features (step 42). At this time, each mobile device 30 may communicate its locally determined trajectory and map to one or more cooperative mapping servers (CMS) 34. Based on this information, CMS 34 computes initial estimates for relative poses for mobile devices 30. CMS 34 may, for example, be any computing platform (system) having one or more programmable processors for executing software to implement the techniques described herein. One example computing platform is discussed in further detail below with respect to FIG. 15.

3) Finally, based on the initial estimates, CMS determines the optimal BLS solution of all users' trajectories and maps (i.e., a composite map of the environment) utilizing all available sensor data, and all, or a subset of, the constraints that arise from commonly-observed point and line features (step 44). The overall map may then be communicated to mobile device for VINS-assisted navigation through the environment.

Our formulation of the CM problem has three desirable characteristics: (i) Each user's dataset becomes a modular component of the final solution. Thus, if a user's dataset contains unreliable measurements, or we need to extend the map to a previously-unknown area, we can add or remove users to the CM problem without recomputing all BLS solutions or all initial relative-pose estimates; (ii) One example algorithm of the techniques of the disclosure can reuse the result of each individual BLS when generating the CM solution, leading to a substantial speedup. (iii) The example CM algorithm provides a convenient mechanism for trading estimation accuracy for computational-cost savings, by reducing the number of constraints imposed by commonly-observed features.

System State and Measurement Models

In this section, we first describe the system states, and then present the measurement models for processing IMU data and visual observations to point, free-line, and Manhattan-line features.

For the remainder of the paper, we denote the position and orientation of frame $\{F_1\}$ in frame $\{F_2\}$ as $^{F_2}p_{F_1}$ and $_{F_1}^{F_2}C$, respectively, where $C$ is a $3\times 3$ rotation matrix. We also define $[e_1, e_2, e_3]=I_3$, where $I_3$ is the $3\times 3$ identity matrix.

System State

Our CM system maintains the following state vector:

$$x = [^1x_u^T \ldots {}^N x_u^T \, x_\tau^T]^T$$

where $^j x_u$, $j=1, \ldots, N$, denotes the state vector corresponding to each user, and $x_\tau$ is the transformation between different users' poses. Furthermore, $^j x_u$ is defined as:

$$^j x_u = [^j \breve{p}^T \, ^j f^T \, ^j q_B^T]^T \quad (1)$$

where $^j\breve{p} \triangleq [^j\breve{p}_1^T \ldots \, ^j\breve{p}_K^T]^T$, $^j\breve{p}_k$, $k=1, \ldots, K$, represents the user's pose at time step k [see (2)], $^j f$ is the vector of all point, $^j x_{P_i}$, free-line, $^j x_{L_i}$, and Manhattan-line, $^j x_{V_i}$, features, defined as $$^j f = \begin{bmatrix} ^j x_{P_1}^T \ldots \, ^j x_{P_{N_p}}^T & ^j x_{L_1}^T \ldots \, ^j x_{L_{N_l}}^T & ^j x_{V_1}^T \ldots \, ^j x_{V_{N_v}}^T \end{bmatrix}^T$$

and $^j q_B$ is the quaternion representation denoting the orientation of the Manhattan world. Defining the z axis of the Manhattan world frame to align with the gravity direction, $^j q_B$ denotes a yaw rotation of angle $^j\alpha_B$, i.e., $$^j q_B = \begin{bmatrix} 0 & 0 & \sin\left(\frac{^j\alpha_B}{2}\right) & \cos\left(\frac{^j\alpha_B}{2}\right) \end{bmatrix}^T$$

Additionally, we assume the IMU and the camera are co-located to simplify the ensuing derivations. In our experiments, we estimate the IMU-camera extrinsic calibration parameters (6 DOF transformation) of each user concurrently with their trajectories and maps.

User Pose State and IMU Measurement Model

An IMU (i.e., gyroscope and accelerometer) provides the user's rotational velocity, $\omega_m$, and linear acceleration, $a_m$, contaminated by white Gaussian noise and time-varying biases. To model the IMU propagation process, we define the user pose at time step k as:

$$\breve{p}_k = [^{C_k}q_G^T \, b_{g_k}^T \, ^G v_{C_k}^T \, b_{a_k}^T \, ^G p_{C_k}^T]^T \quad (2)$$

where $^{C_k}q_G$ is the orientation of the global frame, $\{G\}$, in the IMU's frame of reference, $\{C_k\}$, $^G p_{C_k}$ and $^G v_{C_k}$ are the position and velocity of $\{C_k\}$ in $\{G\}$, and $b_{g_k}$ and $b_{a_k}$ are gyroscope and accelerometer biases, respectively.

The continuous-time IMU propagation model describing the time evolution of the user's pose state is:

$$C\dot{q}_G(t) = \frac{1}{2}\Omega(\omega_m(t) - b_g(t) - n_g(t))^C q_G(t) \quad (3)$$

$$G\dot{v}_C(t) = C(^C q_G(t))^T(a_m(t) - b_a(t) - n_a(t)) + {}^G g$$

$$G\dot{p}_C(t) = {}^G v_C(t)$$

$$\dot{b}_a(t) = n_{wa}$$

$$\dot{b}_g(t) = n_{wg}$$

where $\Omega(\omega)$ is defined as $$\begin{bmatrix} -\lfloor \omega \rfloor & \omega \\ -\omega^T & 0 \end{bmatrix}$$

for $\omega \in \mathbb{R}^3$, $C(^C q_G(t))$ denotes the rotation matrix corresponding to $^C q_G(t)$, $n_g$ and $n_a$ are white Gaussian measurement noise of $\omega_m(t)$ and $a_m(t)$, while $^G g$ denotes the gravitational acceleration in $\{G\}$. Finally, $n_{wa}$ and $n_{wg}$ are zero-mean white Gaussian noise processes driving the gyroscope and accelerometer biases $b_g$ and $b_a$.

The corresponding discrete-time system is determined by integrating (3) between time steps k and k+1. This process can be described by the following equation:

$$\check{p}_{k+1} = g(\check{p}_k, u_k) + w_k \quad (4)$$

where $g(\check{p}_k, u_k)$ is a nonlinear function corresponding to the IMU measurement model, $u_k \triangleq [\omega_{m_k}^T \; a_{m_k}^T]^T$, and $w_k$ is the IMU measurement noise, which is assumed to be zero mean, Gaussian with covariance $Q_k$, computed through IMU characterization.

Point-Feature Measurement Model

By defining the position of a point feature with respect to the first camera pose, $\{C_j\}$, that observes it as $^{C_j}x_{P_i}$, the camera pose $\{C_k\}$ measures the bearing angle to the feature as:

$$^{C_k}z = \pi(^{C_k}p_{C_j} + {}_{C_j}^{C_k}C\, ^{C_j}x_{P_i}) + n_k \quad (5)$$

where $$\pi([x \; y \; z]^T) \triangleq \frac{1}{z}[x \; y]^T$$

represents the camera perspective-projection model, $n_k$ is the measurement noise, $_{C_j}^{C_k}C$ and $^{C_k}p_{C_j}$ are expressed as:

$$_{C_j}^{C_k}C = {}_G^{C_k}C\, _G^{C_j}C^T$$

$$^{C_k}p_{C_j} = {}_G^{C_k}C(^G p_{C_j} - {}^G p_{C_k}) \quad (6)$$

Free-Line Feature State and Measurement Model

FIG. 5 illustrates the parameterization and measurement of free lines (left) and Manhattan lines (right). In this work, we use 4 DOF free-line parameterization. Consider the line $l_i$ in FIG. 5 which is first observed by camera pose $\{C_j\}$. We define a coordinate frame $\{L_i\}$ for this line whose origin, $p_{L_i}$, is the point on the line at minimum distance, $d_{L_i}$, from $\{C_j\}$, x-axis is aligned with the line's direction $l_i$, and z-axis points away from the origin of $\{C_j\}$. Then, the line is represented with respect to $\{C_j\}$ by the parameter vector $^{C_j}x_{L_i} = [^{C_j}q_{L_i}^T \; d_{L_i}]^T$. Defining $_{L_i}^{C_j}C \triangleq C(^{C_j}q_{L_i})$, the origin of the line frame in the camera pose $\{C_j\}$ can be written as $^{C_j}p_{L_i} = d_{L_i} \cdot {}_{L_i}^{C_j}C e_3$.

In the absence of noise, any line measurement $s_k$ in frame $\{C_k\}$, which is defined as a 2-DOF unit vector perpendicular to the plane passing through the line $l_i$ and the origin of $\{C_k\}$, imposes two constraints on the line and the observing camera: $s_k$ is perpendicular to both the line direction and the displacement between the origins of $\{C_k\}$ and $\{L_i\}$, i.e., $$s_k^T \, {}_{C_j}^{C_k}C\, {}_{L_i}^{C_j}C e_1 = 0$$

$$s_k^T(_{C_j}^{C_k}C\, ^{C_j}p_{L_i} + {}^{C_k}p_{C_j}) = 0 \quad (7)$$

where $_{C_j}^{C_k}C$ and $^{C_k}p_{C_j}$ are expressed in terms of the camera poses $\{C_j\}$ and $\{C_k\}$ in (6). In the presence of noise, the measured normal vector is $$s_k' = C\left(s_k^{\parallel}, n_2\right) C\left(s_k^{\perp}, n_1\right) s_k;$$

where the rotational matrices $$C\left(s_k^{\perp}, n_1\right) \text{ and } C\left(s_k^{\parallel}, n_2\right)$$

express the effect of the noise perturbing the true unit vector $s_k$ about two perpendicular axes, $$s_k^{\perp} \text{ and } s_k^{\parallel},$$

by angles of magnitude $n_1$ and $n_2$, respectively.

Manhattan-Line Feature State and Measurement Model

Manhattan lines are aligned with one of the building's cardinal directions, and thus have only 2 DOF. Assuming a line aligns with the x-axis of the Manhattan world $\{B\}$ (i. e., $v_i = e_1$), as in FIG. 5, the Manhattan line with respect to its first observing camera pose $\{C_j\}$ is represented by the parameter vector $^{C_j}x_{V_i} = [\theta_{V_i} \; d_{V_i}]^T$, where $\theta_{V_i}$ is the angle between $^{C_j}p_{V_i}$ and the y-axis of the Manhattan world (i.e., $e_2$), and $d_{V_i}$ is the distance between the origins of $\{C_j\}$ and the Manhattan-line's frame $\{V_i\}$. Using this parameterization, $^{C_j}p_{V_i}$ is expressed as:

$$^{C_j}p_{V_i} = d_{V_i} \, {}_G^{C_j}C\, _B^G C(\cos\theta_{V_i} e_2 + \sin\theta_{V_i} e_3) \quad (8)$$

where $_B^G C$ is the rotation matrix expressing the orientation of the Manhattan world frame $\{B\}$ with respect to the global frame $\{G\}$. Similar to (7), the geometric constraints corresponding to Manhattan lines are:

$$s_k^T \, {}_{C_j}^{C_k}C\, _G^{C_j}C\, _B^G C e_1 = 0$$

$$s_k^T(_{C_j}^{C_k}C\, ^{C_j}p_{V_i} + {}^{C_k}p_{C_j}) = 0 \quad (9)$$

where $_{C_j}^{C_k}C$ and $^{C_k}p_{C_j}$ are defined in (6).

Common-Feature Constraints

In one example problem formulation, if a feature is observed by multiple users, we first define it as a different feature in each user's map but then ensure geometric consistency by imposing constraints on the common features to be the same physical point or line. In what follows, we present the geometric constraints for common point, free-line, and Manhattan-line features.

Consider a point feature $x_{P_i}$ observed by two users whose global frames of reference are $\{G_1\}$ and $\{G_2\}$, respectively, and expressed as $$^{C_{j_1}}x_{P_i} \text{ and } ^{C_{j_2}}x_{P_i}$$

with respect to the first observing camera poses in the two users' maps. The geometric constraint between them is:

$$^{C_{j_1}}x_{P_i} - {}^{C_{j_1}}_{C_{j_2}}C\, ^{C_{j_2}}x_{P_i} - {}^{C_{j_1}}p_{C_{j_2}} = 0 \quad (10)$$

where $$^{C_{j_1}}_{C_{j_2}}C \text{ and } ^{C_{j_1}}p_{C_{j_2}}$$

are then expressed as:

$$^{C_{j_1}}_{C_{j_2}}C = {}^{C_{j_1}}_{G_1}C\, ^{G_1}_{G_2}C\, ^{G_2}_{C_{j_2}}C^T \quad (11)$$

$$^{C_{j_1}}p_{C_{j_2}} = {}^{C_{j_1}}_{G_1}C({}^{G_1}p_{G_2} - {}^{G_1}p_{C_{j_1}} + {}^{G_1}_{G_2}C\, ^{G_2}p_{C_{j_2}}) \quad (12)$$

Figure 6:
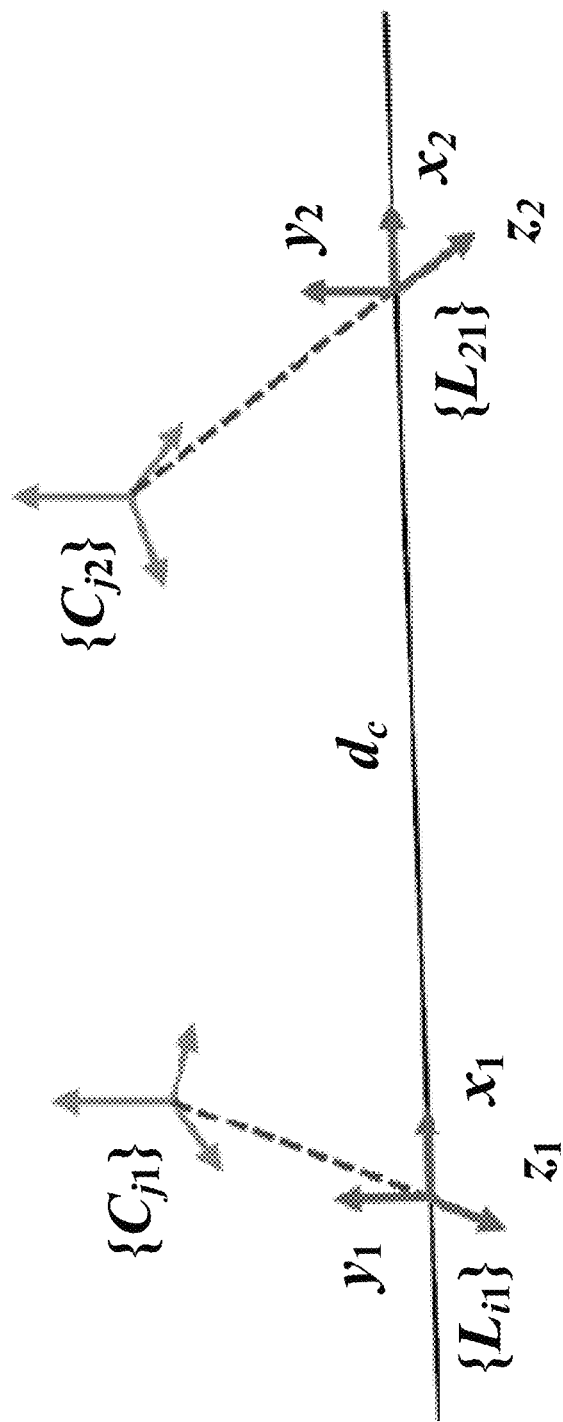
FIG. 6 is a depiction of line constraints in accordance with the techniques of the disclosure.
Figure 7A:
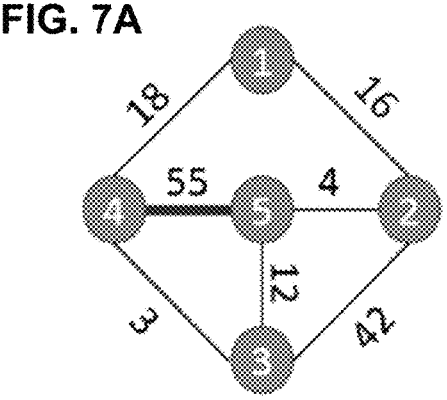
FIGS. 7A-7D are a series of diagrams illustrating the process for finding a minimum spanning tree on the user graph, in accordance with the techniques of the disclosure.
Figure 7B:
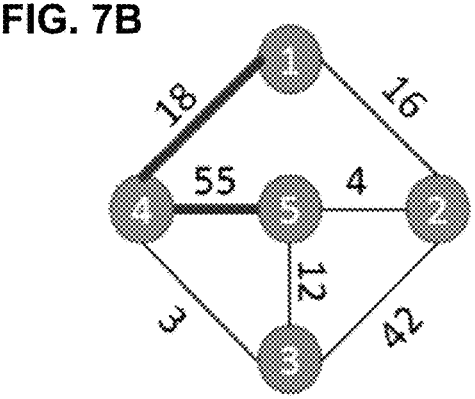
Figure 7C:
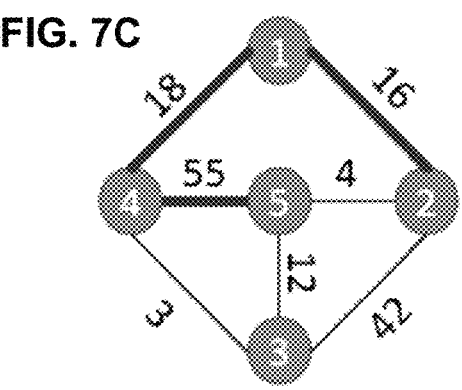
Figure 7D:
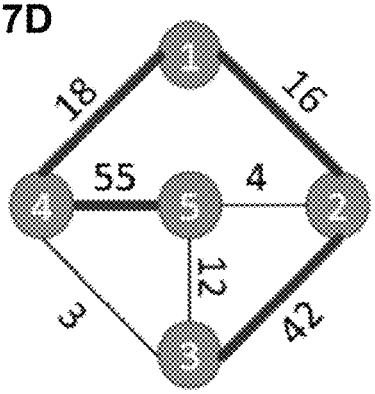

FIG. 6 is a depiction of line constraints in accordance with the techniques of the disclosure. Consider a free-line feature l observed by two users, and expressed with respect to the first observing camera poses $\{C_{j_1}\}$ and $\{C_{j_2}\}$ in their maps, respectively. As evident from FIG. 6, the common free line is represented in the two maps using frames of different origins. For deriving the geometric constraint between two free lines, we employ the following relation between frames $\{C_{j_1}\}$, $\{L_{i_1}\}$, $\{C_{j_2}\}$, and $\{L_{i_2}\}$:

$$^{L_{i_2}}p_{L_{i_1}} = {}^{C_{j_2}}_{L_{i_2}}C^T\left[{}^{C_{j_1}}_{C_{j_2}}C^T\left({}^{C_{j_1}}p_{L_{i_1}} - {}^{C_{j_1}}p_{C_{j_2}}\right) - {}^{C_{j_2}}p_{L_{i_2}}\right] \quad (13)$$

where $$^{L_{i_2}}p_{L_{i_1}} = -d_c e_1.$$

To remove $d_c$ from (13), we define $E_{23} \triangleq [e_2\ e_3]^T$ and multiply with it both sides of (13) to obtain the 2 DOF constraint:

$$E_{23}\,^{C_{j_2}}_{L_{i_2}}C^T\left({}^{C_{j_1}}_{C_{j_2}}C^T\left({}^{C_{j_1}}p_{L_{i_1}} - {}^{C_{j_1}}p_{C_{j_2}}\right) - {}^{C_{j_2}}p_{L_{i_2}}\right) = 0 \quad (14)$$

Then, since the x-axes of frames $\{L_{i_1}\}$ and $\{L_{i_2}\}$ are both defined according to the same line direction, we have the additional 2 DOF constraint:

$$E_{23}\left({}^{C_{j_1}}_{L_{i_1}}Ce_1 - {}^{C_{j_1}}_{C_{j_2}}C\, ^{C_{j_2}}_{L_{i_2}}Ce_1\right) = 0 \quad (15)$$

The common Manhattan-line features also satisfy (13), with the additional information that a Manhattan line is aligned with one of the building's cardinal directions. For example, if the line's direction is $e_1$, we have:

$$^{C_{j_2}}_{L_{i_2}}C\, ^{V_{i_2}}p_{V_{i_1}} = -d_{cB}\, ^{C_{j_2}}Ce_1 \quad (16)$$

Similar to (14), the 2-DOF translational common-Manhattan-line constraint can be written as:

$$E_{23B}\,^{C_{j_2}}C^T\left({}^{C_{j_1}}_{C_{j_2}}C^T\left({}^{C_{j_1}}p_{V_{i_1}} - {}^{C_{j_1}}p_{C_{j_2}}\right) - {}^{C_{j_2}}p_{V_{i_2}}\right) = 0 \quad (17)$$

Note also since the Manhattan lines align with the building's cardinal directions, the orientation constraint corresponding to (15) is automatically satisfied and need not be considered.

Example Algorithm Description

In what follows, we first briefly review the BLS method for determining the trajectory and map of each user based on only its own measurements, and then describe in detail an approach to find an initial estimate for the relative poses between users. Subsequently, we introduce our example CM algorithm and present a method for "sparsifying" (i.e., reducing their number and thus spatial density) the commonly-observed-feature constraints.

Single-User Batch Least-Squares

For a user j, computing the BLS estimate requires minimizing the following non-linear cost function:

$$\mathcal{E}_j = \|{}^j\breve{p} - g({}^j\breve{p}, {}^ju)\|_{{}^jQ}^2 + \|{}^jz - h({}^jx_u)\|_{{}^jR}^2 \quad (18)$$

where the first term corresponds to the cost function arising from IMU measurements (4), while the second term is due to visual observations of point (5), free-line (7), and Manhattan-line (9) features. Also, in (18) ${}^j\breve{p}$ and ${}^jx_u$ denote the user' poses and entire state [see (1)], respectively, ${}^ju$ includes all IMU measurements, ${}^jz$ comprises all visual observations, ${}^jQ$ and ${}^jR$ are the covariance matrices of the corresponding measurement noises.

The cost function (18) can be minimized by employing Gauss-Newton iterative minimization. In particular, by expressing the error states of ${}^jx_u$ with $\delta{}^jx_u$, we have the linearized cost function:

$$\mathcal{E}_j' = \|J_j\delta{}^jx_u - b_j\|^2 \quad (19)$$

where $J_j$ and $b_j$ are the Jacobian and residual, respectively. In each Gauss-Newton iteration, (19) is solved very efficiently by using the Cholmod algorithm. Specifically, defining $G_j$ as the Cholesky factor of the Hessian, i.e., $G_j G_j^T = J_j^T J_j$, we minimize (19) with respect to $\delta{}^jx_u$ as follows:

$$J_j^T J_j \delta{}^jx_u = J_j^T b_j \Leftrightarrow G_j G_j^T \delta{}^jx_u = J_j^T b_j$$

$$\Leftrightarrow G_j \delta{}^jy_u = J_j^T b_j, \text{ with } \delta{}^jy_u = G_j^T \delta{}^jx_u \quad (20)$$

which involves consecutively solving two triangular systems. Once $\delta{}^jx_u$ is computed, it is used to update the estimates for $^j x_u$, and initiate a new Gauss-Newton iteration until convergence ($\|\delta' x_u\| <$size($\delta' x_u$)×10$^{-5}$).

Note the Gauss-Newton minimization described above can be performed by each user independently (in parallel or at different times) to compute an estimate of each user's state $^j x_u$. These estimates and the Choleskey factor, $G_j$, will be provided to the CM algorithm for merging all maps. Before computing the merged map, however, an initial estimate of the transformation between the users' reference frames is needed. This initialization process using visual observations of common, amongst the different users' maps, point features is described in the next section.

Initial Estimate of the Users' Relative Poses

In what follows, we first describe our algorithm for computing the transformation between two users, which can be used in a minimal solver in conjunction with RANSAC for outlier rejection and/or to find an approximate least-squares solution. Then, we explain our approach for computing the transformation between all users.

1) Transformation between pairs of users: When using visual and inertial measurements, the roll and pitch angles of each user's orientation are observable in the inertial frame of reference. Therefore, the transformation between any two users has four DOF: One corresponding to their relative yaw angle and three corresponding to their relative position. By defining the two users' frames of reference as $\{G_1\}$ and $\{G_2\}$, we seek to estimate the position and orientation of $\{G_2\}$ with respect to $\{G_1\}$, denoted as $^{G_1}p_{G_2}$ and $_{G_2}^{G_1}C$, respectively. Note that $_{G_2}^{G_1}C$ corresponds to a rotation about the global z-axis, which is aligned with gravity, and thus equals:

$$_{G_2}^{G_1}C = \begin{bmatrix} \cos\theta & -\sin\theta & 0 \\ \sin\theta & \cos\theta & 0 \\ 0 & 0 & 1 \end{bmatrix} \quad (21)$$

When two users observe the same point feature $x_{P_j}$, $j=1,\ldots,M$, the geometric constraint between them is:

$$^{G_1}x_{P_j} = {}^{G_1}p_{G_2} + {}_{G_2}^{G_1}C \, {}^{G_2}x_{P_j} \quad (22)$$

where $^{G_1}x_{P_j}$, $^{G_2}x_{P_j}$ are the point feature $x_{P_j}$'s 3D positions expressed in $\{G_1\}$ and $\{G_2\}$, respectively.

Subtracting the constraint (22) corresponding to feature $x_{P_1}$ from the constraints (22) corresponding to $x_{P_j}$, $j=2,\ldots,M$, results in:

$$^{G_1}x_{P_j} - {}^{G_1}x_{P_1} = {}_{G_2}^{G_1}C({}^{G_2}x_{P_j} - {}^{G_2}x_{P_1}) \quad (23)$$

which can be rewritten as:

$$A_j \begin{bmatrix} \cos\theta \\ \sin\theta \end{bmatrix} \triangleq A_j w = b_j, \; j=2,\ldots,M \quad (24)$$

where $A_j$ and $b_j$ are a 3×2 matrix and a 3×1 vector respectively, and both of them are functions of $^{G_1}x_{P_j}$, $^{G_1}x_{P_1}$, $^{G_2}x_{P_j}$, and $^{G_2}x_{P_1}$. By defining $A=[A_2^T, \ldots, A_M^T]^T$ and $b=[b_2^T,\ldots,b_M^T]^T$, w can be obtained by solving the following minimization problem:

$$w^* = \arg\min\|Aw - b\|^2$$

$$s.t.\|w\|^2 = 1 \quad (25)$$

Note that (25) is a least-squares problem with a quadratic constraint, which can be solved by following the general methodology of [31]. Instead, in this work we provide a more efficient solution herein, which takes advantage of the fact that w is a 2×1 vector.

After solving for the yaw angle θ, we substitute $_{G_2}^{G_1}C$ in (22) and obtain $^{G_1}p_{G_2}$ as:

$$^{G_1}p_{G_2} = \frac{1}{M}\sum_{j=1}^{M}\left({}^{G_1}x_{P_j} - {}_{G_2}^{G_1}C\,{}^{G_2}x_{P_j}\right) \quad (26)$$

Both $^{G_1}p_{G_2}$ in (26) and $_{G_2}^{G_1}C$ corresponding to the w calculated in (25) will be used for initializing the example CM algorithm. Note also this transformation will be estimated by CM so as to improve the mapping accuracy.

The aforementioned process assumes that all matched point features are inliers and their 3D position estimates $^{G_1}\hat{x}_{P_j}$, $^{G_2}\hat{x}_{P_j}$, $j=1,\ldots,M$, are accurate. In practice, we employ RANSAC to remove outliers. Specifically, the solution of (25) and (26) for M=2 are used as the minimal solver for RANSAC.

2) Initial transformation between multiple users: A naive approach to obtain the relative pose between any two users is to compute the relative transformation between all possible pairs. Instead, we seek to compute the initial transformation between any two users indirectly by employing a chain of pairwise transformations. To do so, we select the "best" pairwise transformations (in the sense that they are computed using the maximum number of common features) that form a chain connecting all users. In order to solve this problem, we first construct a graph whose vertices correspond to each user and edges are assigned weights proportional to the number of commonly-observed features between the corresponding users, and then compute the minimum spanning tree (MST).

FIGS. 7A-7D are a series of diagrams illustrating the process for finding a minimum spanning tree (marked in bold) on the user graph. The numbers of commonly-observed features between pairs of users are written on the edges in FIG. 7. In this way, FIG. 7 illustrates an example of finding the chain connection between users, where the transformations between fives users are obtained by combining the transformation pairs (5, 4), (4, 1), (1, 2), (2, 3). Finally, we estimate the transformation between user pairs corresponding to the edges in the resulting MST.

Cooperative Mapping Constructing the Overall Map

In this section, we first present the standard BLS formulation of the CM problem and briefly discuss its drawbacks. Subsequently, we reformulate CM as a constrained optimization problem, and show the equivalence of its solution to that of the BLS formulation. The solution of the CM formulation is then described, and then its advantages as compared to the BLS formulation are described.

1) BLS Formulation: As previously mentioned, linking the different users' maps requires using observations of common features. The standard BLS formulation when applied to the CM problem achieves this by modifying the camera measurement model for all three types of features to explicitly consider the transformation between the reference frames of the users observing the same features. Specifically, for a feature first observed by user $\{G_1\}$ at camera pose $\{C_{j_1}\}$, its observation from user $\{G_2\}$ at camera pose $\{C_{k_2}\}$ can be still expressed with original point (5), free-line (7), and Manhattan-line (9) measurement models, but $${}^{C_{k_2}}_{C_{j_1}} C \text{ and } {}^{C_{k_2}}p_{C_{j_1}}$$

need to be redefined including the transformation between the two users as:

$${}^{C_{k_2}}_{C_{j_1}} C = {}^{C_{k_2}}_{G_1} C \, {}^{G_1}_{G_2} C \, {}^{C_{j_1}}_{G_2} C^T \quad (27)$$

$${}^{C_{k_2}}p_{C_{j_1}} = {}^{C_{k_2}}_{G_1} C ({}^{G_1}p_{G_2} - {}^{G_1}p_{C_{k_2}} + {}^{G_1}_{G_2} C \, {}^{G_2}p_{C_{j_1}})$$

This new camera model, for all common observations, can be written in a compact form as:

$$z_c = s(x_a, f_c, x_\tau) + n_c \quad (28)$$

where $x_\tau$ is a vector of size $4(N-1)$ comprising the pairwise transformations between users computed as described in Section V-B, $x_a \triangleq [{}^1\check{p}^T \ldots {}^1\check{p}^T]^T$ is the vector comprising all users' poses, $f_c$ is the set of common features observed by two or more users, and $n_c$ is the corresponding measurement noise of covariance $R_c$.

Following the standard BLS formulation, we can construct the cost function for the CM problem by summing the following terms: (i) $\bar{\mathcal{b}}_i$, the cost function of each individual user after removing all cost terms involving common features [see (18)]. (ii) The cost terms arising from each user's observations to common features [see (28)]. Thus, our objective function becomes:

$$x_\tau^*, x_a^*, f_a^*, f_c^* = \text{argmin} \, (\Sigma_{i=1}^N \bar{\mathcal{b}}_i + \|z_c - s(x_a, f_c, x_\tau)\|_{R_c}^2) \quad (29)$$

where $f_a$ are the features observed by only one user. The Hessian of problem (29) has very clear structure: Different users' states are uncorrelated from $\Sigma_{i=1}^N \bar{\mathcal{b}}_i$, comprising of all IMU and most of camera measurements, and their correlations all come from a small number of common-feature observations, $\|z_c - s(x_a, f_c, x_\tau)\|_{R_c}^2$.

A standard BLS solution can be obtained following the same procedure as (20), by applying Cholesky factorization on the Hessian matrix arising from measurements corresponding to all users. This strategy treats the problem as one user collecting a large dataset, ignoring the fact there exist few correlations between different users' states. In the next section, we will present an example algorithm of the techniques of the disclosure that constructs a Hessian matrix corresponding to each user, and enforces their correlations through common-feature constraints. As shown later, this design will result in a solution that is parallelizable, efficient, and modular.

2) CM Formulation: To introduce the proposed CM formulation, we employ the following theorem:

Theorem 1: The optimization problem (29) is equivalent to the following constrained optimization problem:

$$x_\tau^*, x_a^*, f_a^*, f_{c_1}^*, \ldots, f_{c_N}^* = \text{argmin} \sum_{i=1}^N \mathcal{b}_i \quad (30)$$

$$\text{s.t. } \mathcal{K}(x_a, x_\tau, f_{c_i}, f_{c_j}) = 0,$$

$$i, j = 1, \ldots, N, i \neq j$$

where $\mathcal{b}_i$ denotes the cost function for user i [see (18)], $f_{c_i}$ is defined as the subset of $f_c$ observed by user i, and $\mathcal{K}$ ($x_a$, $x_\tau$, $f_{c_i}$, $f_{c_j}$) denotes common-feature constraints as defined in (10), (14), (15), and (17). Note that both $f_{c_i}$ and $f_{c_j}$ are optimization variables here.

Proof: We will first prove the theorem for a simple case when a point feature is observed by two users. Then, we can easily extend this case to multiple users and line features.

Consider a point feature, $${}^{C_{j_1}}x_{P_i},$$

defined with respect to the camera pose $\{C_{j_1}\}$ of user $\{G_1\}$, and also observed by user $\{G_2\}$ at camera pose $\{C_{k_2}\}$. The BLS formulation of this problem is written as:

$$x_\tau^*, x_a^*, f_a^* \, {}^{C_{j_1}}x_{P_i}^* = \quad (31)$$

$$\text{argmin} \left( \sum_{i=1}^N \bar{\mathcal{b}}_i + \left\| {}^{C_{k_2}}z - \pi \left( {}^{C_{k_2}}p_{C_{j_1}} + {}^{C_{k_2}}_{C_{j_1}} C \, {}^{C_{j_1}}x_{P_i} \right) \right\|_{R_i} \right)$$

On the other hand, the proposed CM formulation is:

$$x_\tau^*, x_a^*, f_a^* \, {}^{C_{j_1}}x_{P_i}^* \, {}^{C_{j_2}}x_{P_i}^* = \text{argmin} \sum_{i=1}^N \mathcal{b}_i \quad (32)$$

$$\text{s.t. } {}^{C_{j_2}}x_{P_i} = {}^{C_{j_2}}_{C_{j_1}} C \, {}^{C_{j_1}}x_{P_i} + {}^{C_{j_2}}p_{C_{j_1}} \quad (33)$$

where the feature is redefined as $${}^{C_{j_2}}x_{P_i}$$

with respect to a camera pose $\{C_{j_2}\}$ of user $\{G_2\}$. Note the regular camera measurement model [see (5)] is employed to express the feature's observation from user $\{G_2\}$, and the corresponding cost term is included in $\mathcal{b}_2$ as:

$$\left\| {}^{C_{k_2}}z - \pi \left( {}^{C_{k_2}}p_{C_{j_2}} + {}^{C_{k_2}}_{C_{j_2}} C \, {}^{C_{j_2}}x_{P_i} \right) \right\|_{R_i} \quad (34)$$

Substituting constraint (33) into cost term (34) results in:

$$\left\| {}^{C_{k_2}}z - \pi \left( {}^{C_{k_2}}p_{C_{j_2}} + {}^{C_{k_2}}_{C_{j_2}} C \, {}^{C_{j_2}}x_{P_i} \right) \right\|_{R_i} \Leftrightarrow \quad (35)$$

$$\left\| {}^{C_{k_2}}z - \pi \left( {}^{C_{k_2}}p_{C_{j_2}} + {}^{C_{k_2}}_{C_{j_2}} C ({}^{C_{j_2}}_{C_{j_1}} C \, {}^{C_{j_1}}x_{P_i} + {}^{C_{j_2}}p_{C_{j_1}}) \right) \right\|_{R_i} \Leftrightarrow$$

$$\left\| {}^{C_{k_2}}z - \pi \left( {}^{C_{k_2}}p_{C_{j_1}} + {}^{C_{k_2}}_{C_{j_1}} C \, {}^{C_{j_1}}x_{P_i} \right) \right\|_{R_i}$$

which is the same as the corresponding cost term in the BLS formulation (31). Therefore, the CM formulation (30) and BLS formulation (29) are equivalent in this case.

When multiple features commonly observed by multiple users, a constraint is added in the CM formulation for each common feature observation, and the equivalence between BLS and CM formulations is established by substituting the constraints in the cost function. By replacing the corresponding measurement model and common-feature constraint, this proof can also be extended to common free-line and Manhattan-line features straightforwardly.

Note the Hessian matrix corresponding to the cost function in the CM formulation (30) has a block-diagonal structure, where each block comprises the state of a user. Solving CM as a constrained optimization problem has several advantages.

3) CM Solution: Since problem (30) is nonlinear, we solve it employing Gauss-Newton iterative minimization [33]. At each iteration, we focus on the following (linearized) constrained optimization problem:

$$\delta x_\tau^*, \delta^1 x_u^*, \ldots, \delta^N x_u^* = \operatorname{argmin} \sum_{i=1}^{N} \|J_i \delta^i x_u - b_i\|^2 \quad (36)$$

$$\text{s.t.} \sum_{i=1}^{N} A_i \delta^i x_u + A_\tau \delta x_\tau = r$$

where $\delta^i x_u$ and $\delta x_\tau$ are the error states of user state, $^i x_u$, and transformations between users, $x_\tau$, respectively, while $J_i$ and $b_i$ are the corresponding Jacobian and residual of $\mathcal{E}_2$ in (30). $A_i$, $A_\tau$, and $r$ are the Jacobians (corresponding to $^i x_u$ and $x_\tau$) and residual of the constraints.

The KKT optimality conditions [34] for (36) are:

$$J_i^T(J_i \delta^i x_u - b_i) + A_i^T \lambda = 0, \, i=1, \ldots, N$$

$$\Sigma_{i=1}^{N} A_i \delta^i x_u + A_\tau \delta x_\tau = r = 0$$

$$A_\tau^T \lambda = 0 \quad (37)$$

where $\lambda$ is the Lagrange-multiplier vector.

To simplify notation, in what follows we present an example algorithm for solving (37) for the case of two users, while its extension to three or more users is straightforward.

Writing (37) in a compact form yields:

$$\underbrace{\begin{bmatrix} J_1^T J_1 & & A_1^T & \\ & J_2^T J_2 & A_2^T & A_\tau \\ A_1 & A_2 & & \\ & & A_\tau^T & \end{bmatrix}}_{H_{CM}} \begin{bmatrix} ^1 x_u \\ ^2 x_u \\ \lambda \\ \delta x_\tau \end{bmatrix} = \begin{bmatrix} J_1^T b_1 \\ J_2^T b_2 \\ r \\ 0 \end{bmatrix} \quad (38)$$

Note that due to the zeros in the (3, 3) and (4, 4) block-diagonal elements, $H_{CM}$ is not positive definite. Thus, Cholesky factorization cannot be applied. Although other methods, such as diagonal pivoting [35], can be employed to solve (38), we propose an alternative approach that takes advantage of $H_{CM}$'s structure and the Cholesky factors previously computed by each user based on the following theorem:

Theorem 2: $H_{CM}$ can be factorized into the product of a lower-triangular matrix and an upper-triangular matrix as:

$$H_{CM} = \begin{bmatrix} G_1 & & & \\ & G_2 & & \\ K_1^T & K_2^T & T_{11} & \\ & & T_{21} & T_{22} \end{bmatrix} \begin{bmatrix} G_1^T & & K_1 & \\ & G_2^T & K_2 & \\ & & -T_{11}^T & T_{21}^T \\ & & & -T_{22}^T \end{bmatrix} \quad (39)$$

where $G_1$ and $G_2$ are the Cholesky factors of the users' Hessian matrices $J_1^T J_1$ and $J_2^T J_2$ respectively, and $T_{11}$ and $T_{22}$ are lower-triangular matrices.

Proof: Multiplying the two triangular matrices in (39) and employing the structure of $H_{CM}$ in (38) yields the following system of equations:

$$G_i K_i = A_i^T, \, i=1,2 \quad (40)$$

$$T_{11} T_{11}^T = \Sigma_{i=1}^{2} K_i^T K_i \quad (41)$$

$$T_{11} T_{21}^T = A_\tau \quad (42)$$

$$T_{22} T_{22}^T = T_{21} T_{21}^T \quad (43)$$

To find matrices $K_1$, $K_1$, $T_{11}$, $T_{21}$ and $T_{22}$ that satisfy (40)-(43), we first compute $K_i$, i=1,2, by solving a linear equation corresponding to each of the columns of $K_i$ [see (40)].

Defining $K=[K_1^T K_2^T]^T$, it is easy to see that $$\sum_{j=1}^{2} K_j^T K_j = K^T K = [A_1 \, A_2] \begin{bmatrix} (G_1 G_1^T)^{-1} & 0 \\ 0 & (G_2 G_2^T)^{-1} \end{bmatrix} \begin{bmatrix} A_1^T \\ A_2^T \end{bmatrix}$$

is a positive definite matrix because $[A_1 \, A_2]$ has full row rank (i.e., each common feature constraint appears only once). Thus, we compute $T_{11}$ as the Cholesky factor of $K^T K$ that satisfies (41). Given $T_{11}$, we determine $T_{21}$ using triangular back-substitution according to (42).

Lastly, $T_{21} T_{21}^T$ is also positive definite, and thus $T_{22}$ is selected as the Cholesky factor of $T_{21} T_{21}^T$ [see (43)].

Once all the block matrices in (39) are obtained, (38) is efficiently solved by employing two back-substitutions involving triangular matrices.

Now, we briefly discuss the computational complexity of computing each block in (39). The Cholesky factors $G_i$ do not require any calculation in the first Gauss-Newton iteration, because they have already been computed by each user. Starting from the second Gauss-Newton iteration, the $G_i$ matrices need to be re-computed, which can be done in parallel, at a cost that depends on the structure of the Hessian.

Computing the $K_i$ matrices involves triangular back substitution according to (40), which has low computational cost for two reasons: (i) the $A_i$ matrices are very sparse (less than 0:01% nonzero elements); (ii) each column of the $K_i$ matrices can be computed in parallel. Note also that since the number of columns of K is equal to the number of commonly-observed feature constraints, the time for computing K grows linearly with the number of constraints.

Defining each row in K as $k_j$, $K^T K$ can be computed as $\Sigma k_j^T k_j$, where all the terms in the summation can be calculated in parallel. Since the size of $k_j$ equals to the dimension of the commonly-observed feature constraints, the overall computational complexity increases quadratically with the number of constraints.

The $T_{11}$ matrix is the Cholesky factor of $K^T K$. Although K is sparse (about 1% nonzero elements), since it is typically a tall matrix, $K^T K$ is generally a small dense square matrix with size equal to the number of commonly-observed feature constraints. Thus, computing $T_{11}$ has cubic processing cost with respect to the number of constraints.

Lastly, both $T_{21}$ and $T_{22}$ are very small matrices, and thus take very little time to compute. Once all the block matrices are computed, solving the linear system requires only two sparse back triangular substitutions.

As we will show in the experimental results, the most computationally demanding parts of the example CM algorithm is either computing $G_i$ or $K^T K$ depending on the number of commonly-observed feature constraints. Fortunately, both these operations are parallelizable.

CM Solution Advantages: Formulating and solving CM as a constrained optimization problem has the following advantages:

Parallelization: In (29), due to the features observed by multiple users, many of the off-diagonal blocks in the resulting Hessian matrix are nonzero. Thus, there is no straightforward way to parallelize computations. In contrast, and as described above, most operations required for solving (30) are parallelizable (e.g., computing the $K_i$ and $G_i$ matrices). This is of particular importance when mapping very large areas such as airports, museums, shopping malls, etc.

Efficiency: The BLS formulation (29) requires to apply Cholesky factorization on the Hessian created from all the users' data, while the proposed formulation (30) applies Cholesky factorization on the smaller-size Hessians created from each user's data. Since the memory requirements of Cholesky factorization directly relates to the problem size, solving (29) is much more memory demanding. In terms of processing, the Cholesky factor of each individual user's Hessian matrix can be reused in an example algorithm of the proposed technical solutions of the disclosure to save computational cost.

Modularity: In (29), the feature measurement model changes if a common feature is already defined in another map, in which case the transformation between the maps needs to be involved. In contrast, in (30) common features always use the same measurement model as the rest of features which does not involve the transformation between maps, thus the feature measurement model is uniform. Moreover, adding or removing users' trajectories and maps does not affect the Jacobian matrices of the other users. Instead, we simply add the corresponding constraints. This is especially convenient when expanding the map or updating pre-existing maps.

Covariance of CM estimates: For a standard BLS solution, we can find the uncertainty of the estimate, i.e., covariance matrix, by inverting the system's Hessian matrix. Since we formulate CM as a constrained optimization problem, the estimate's covariance cannot be computed following the same procedure.

Commonly-Observed Feature Sparsification: Resource-Aware CM

As analyzed in the end of Section V-C3, the computational cost of the example CM algorithm increases quadratically to cubically with the number of commonly-observed features. Therefore, the example CM algorithm is ideal for scenarios where there are a small number of inter-dataset loop-closures. On the other hand, if users view a large number of common features, the example CM algorithm will become expensive. Such a scenario motivates us to reduce the number of common features by selecting an informative subset of common feature constraints to include in the CM formulation. Specifically, retaining only a subset of common features in (30), expressed as $\bar{f}_{c_1}, \ldots, \bar{f}_{c_N}$, yields:

$$x_\tau^*, x_a^*, f_a^*, f_{c_1}^*, \ldots, f_{c_N}^* = \arg\min \sum_{i=1}^N \mathcal{O}_i \quad (44)$$

$$\text{s.t. } \mathcal{K}(x_a, x_\tau, \bar{f}_{c_i}, \bar{f}_{c_j}) = 0,$$

$$i, j = 1, \ldots, N, i \neq j$$

By doing so we do not drop or change any feature measurement. Instead, we make an approximation that a feature common in two or more maps corresponds to different physical features in each user's map. Additionally, since no spurious information is gained through this approximation, this feature sparsification method is consistent.

The optimal solution to the problem of selecting the M most informative (in terms of expected CM accuracy) out of N commonly-observed features has computational cost significantly higher than computing the CM using all available features. For this reason, we introduce a heuristic method to efficiently select commonly-observed features which are (i) evenly distributed across the physical space; and (ii) accurately estimated in each map, so as to improve rigidity and accuracy of the resulting merged map.

The first requirement is satisfied by evenly partitioning the physical space into different regions using a fixed-size grid. Since the resulting map comprises of 3D point and line features, and in order to improve efficiency, we first partition the map into 3D levels, and then project all features belonging to a certain level on the corresponding x-y plane for that level. The process for splitting the 3D map into separate levels, based on the histogram of the features' density when projected on the z-axis, is automated. Typically, large feature concentrations appear on the ceiling and floor of each level with several meters' gaps between them, which makes the level-separation problem fairly easy to solve. Subsequently, we "sparsify" the corresponding map of commonly-observed features by selecting two point features per cell, which is the minimum number of features required for determining the transformation between two maps. These two features are selected according to the second requirement. Specifically, we pick two common features with most number of observations, because the accuracy of feature estimate increases with growing number of camera measurements.

FIGS. 14A-14D illustrate example common point features before and after sparsification using grids of different sizes, in accordance with the techniques of the disclosure. In particular, FIG. 14 illustrates common point features: (a) Original CM, sparse CM using grids of size (b) 1×1 m², (c) 4×4 m², (d) 8×8 m². This common feature sparsification method is shown to be effective in our experimental results. For example, in a building-sized dataset, after reducing the number of common feature from more than four thousand to about two hundred, the root-mean-square difference of estimated user trajectory is only 13.5 cm.

Experiment Results

In this section, we first describe our experiment setup, followed by introducing the point and line feature tracking methods within a single and across multiple user maps. Then, we provide experimental results demonstrating the accuracy improvement by employing line features in addition to point features. Finally, we show that employing the feature-sparsification of the CM results in significant processing and memory savings with only limited accuracy loss.

Dataset Collection and Algorithm Implementation: The visual and inertial measurements used in our CM tests were collected using a Project Tango developer phone and tablet. Greyscale images, with resolution 640×480, were saved at 15 Hz, along with consumer-grade, MEMS-based, IMU data at 100 Hz. To evaluate the example algorithm, four datasets were acquired while navigating through a large building, the Keller Hall at the University of Minnesota, over a period of three days.

Figure 10A:
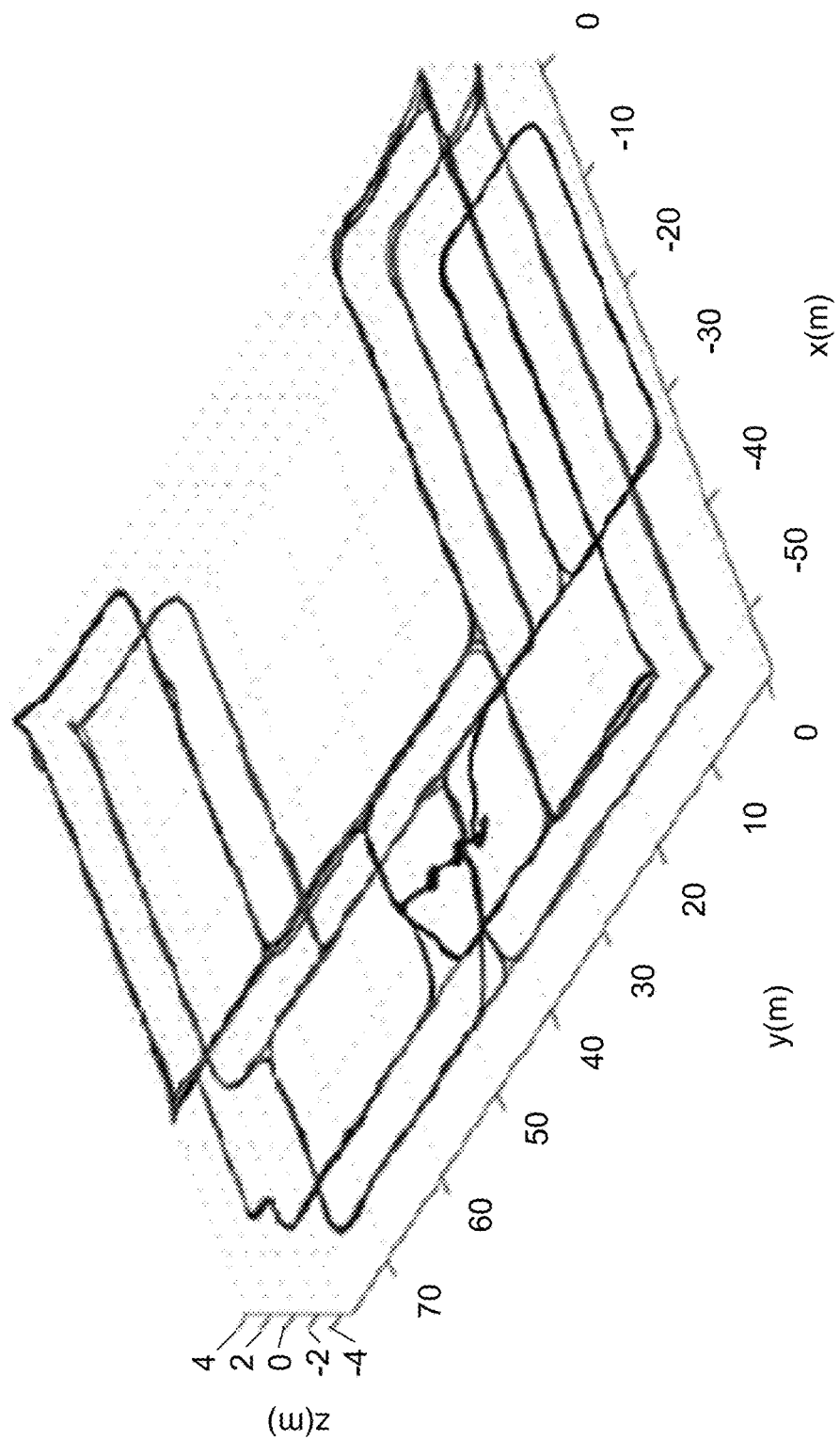
FIGS. 10A-10C depict a merged map of the CM estimated trajectories of FIGS. 9A-9D, in accordance with the techniques of the disclosure.
Figure 10B:
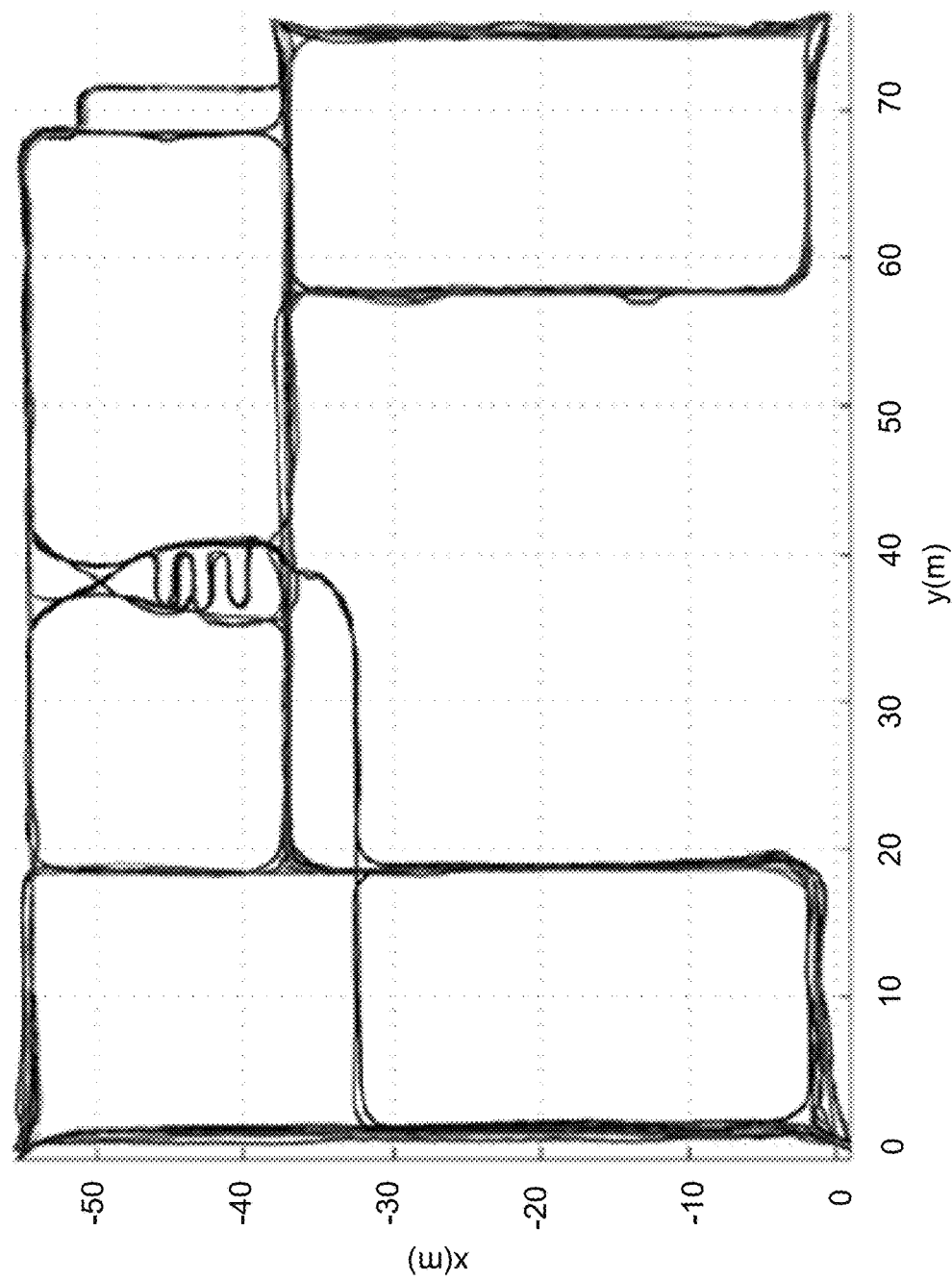
Figure 10C:
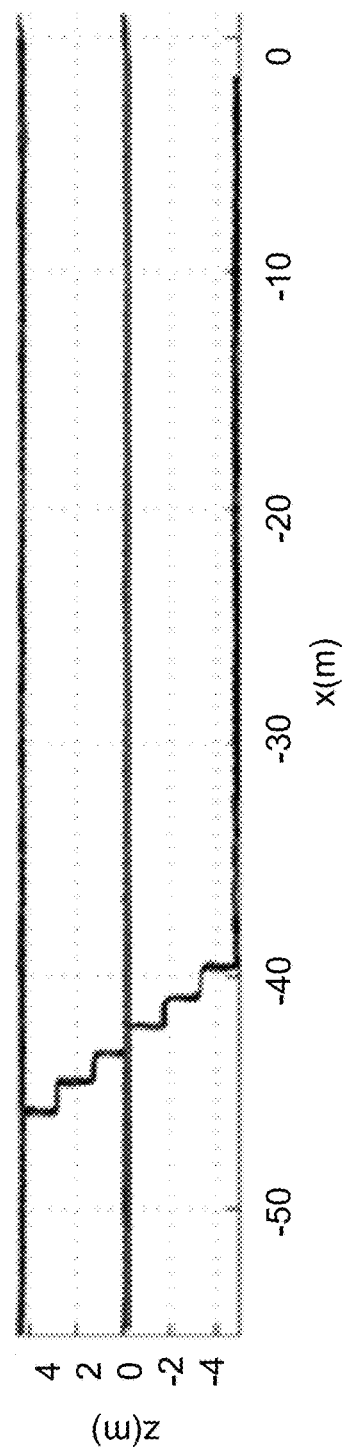

FIGS. 9A-9D depict cooperative mapping (CM) estimated trajectories, in accordance with the techniques of the disclosure. FIGS. 10A-10C depict a merged map of the CM estimated trajectories of FIGS. 9A-9D, in accordance with the techniques of the disclosure. Each of the CM estimated trajectories of the four datasets are shown separately in FIG. 9. FIG. 10 illustrates merged trajectories of all users from (a) 3D, (b) y-x, and (c) x-z views.

Figure 8A:
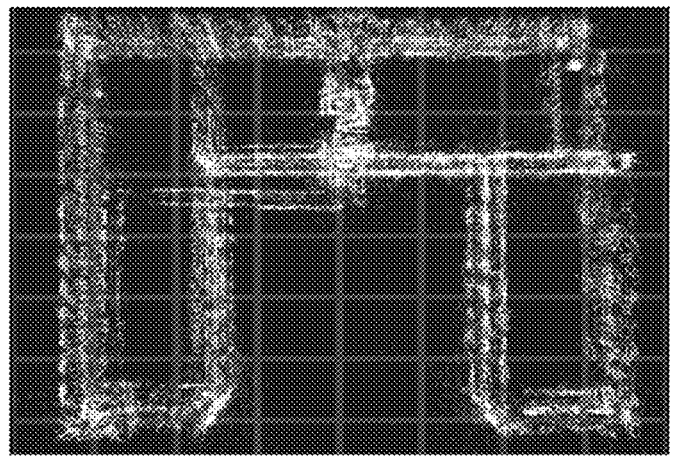
FIGS. 8A-8C depict an estimated feature 3D point cloud, in accordance with the techniques of the disclosure.
Figure 8B:
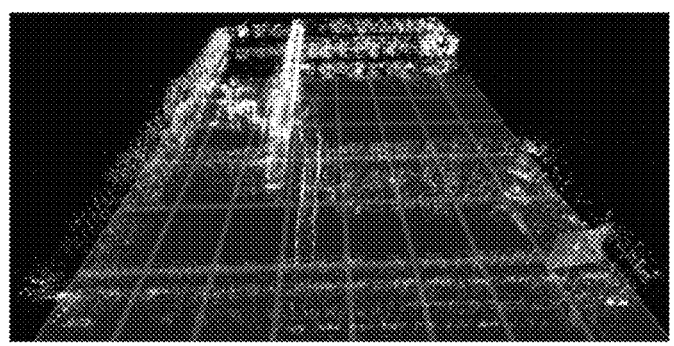
Figure 8C:
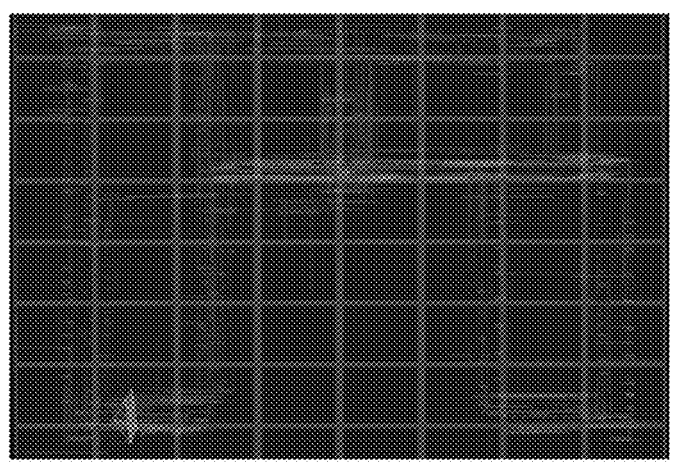
Figure 9A:
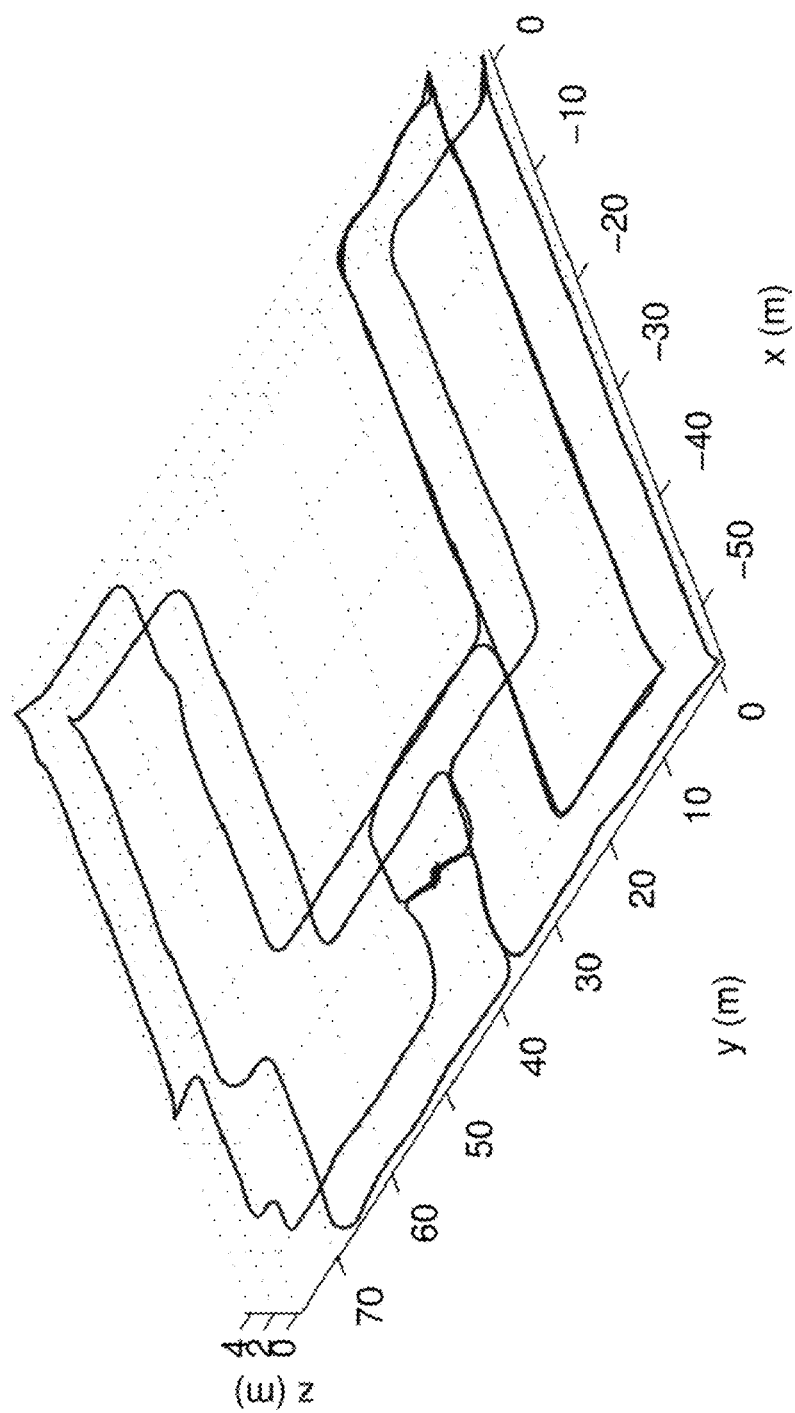
FIGS. 9A-9D depict cooperative mapping (CM) estimated trajectories, in accordance with the techniques of the disclosure.
Figure 9B:
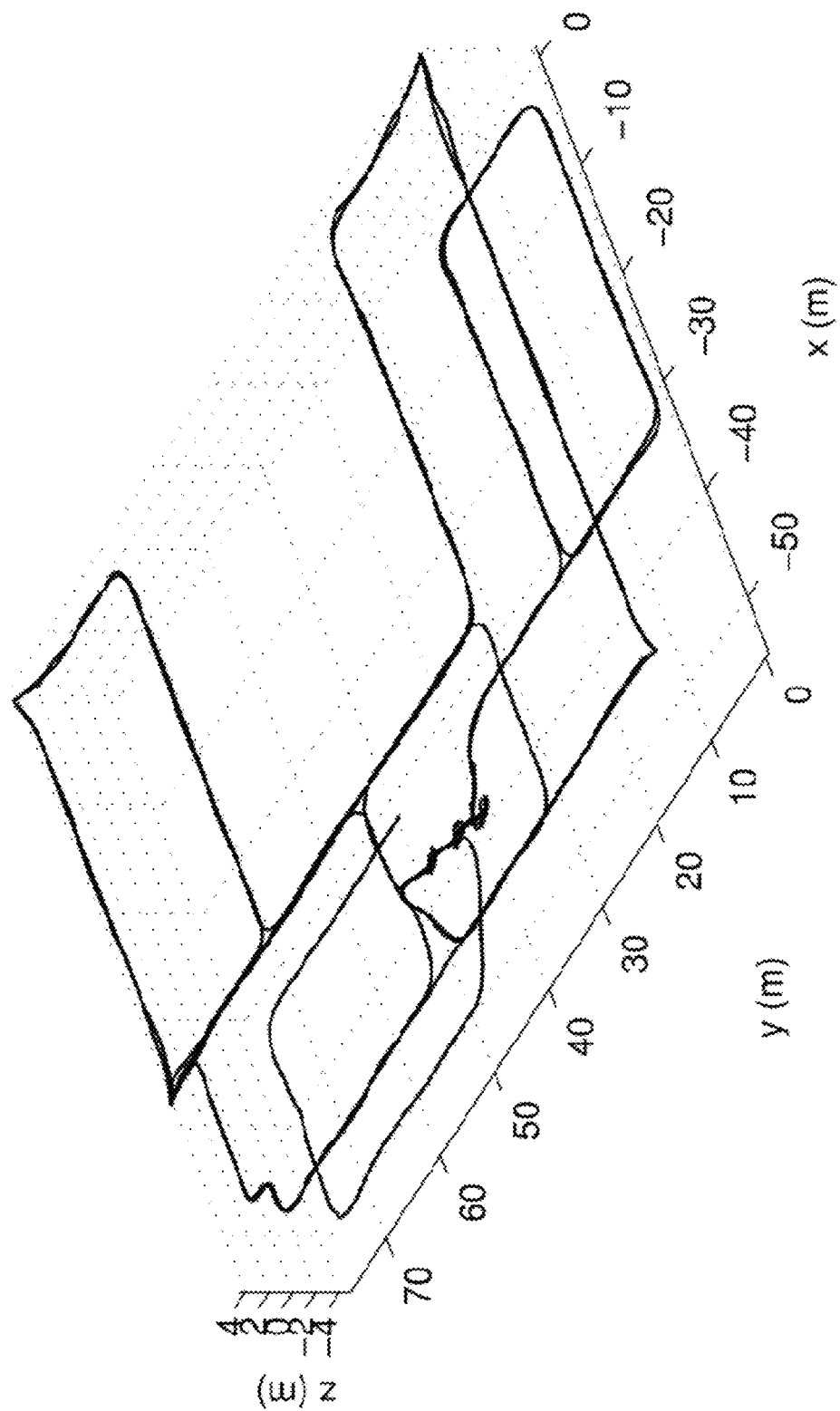
Figure 9C:
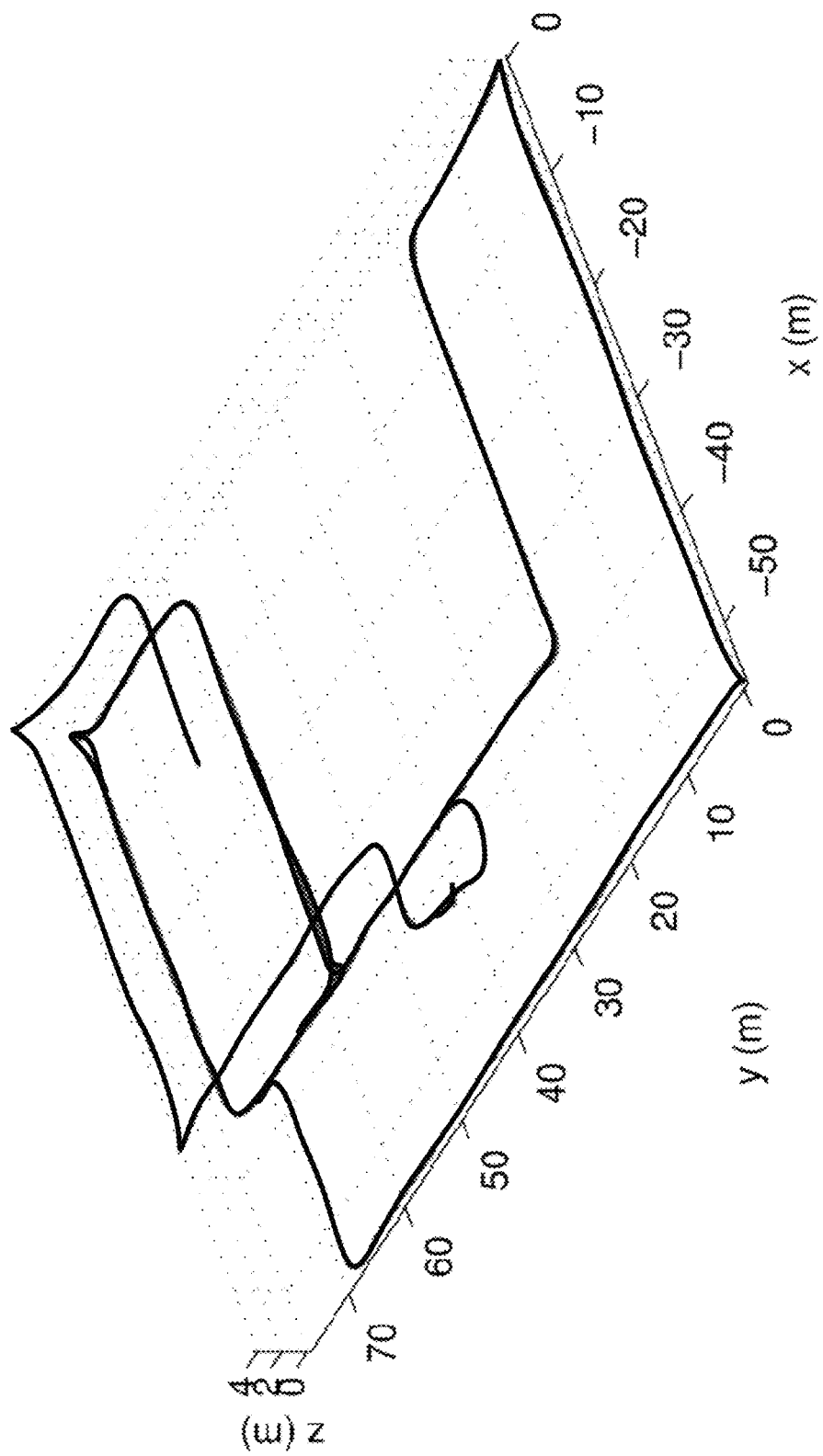
Figure 9D:
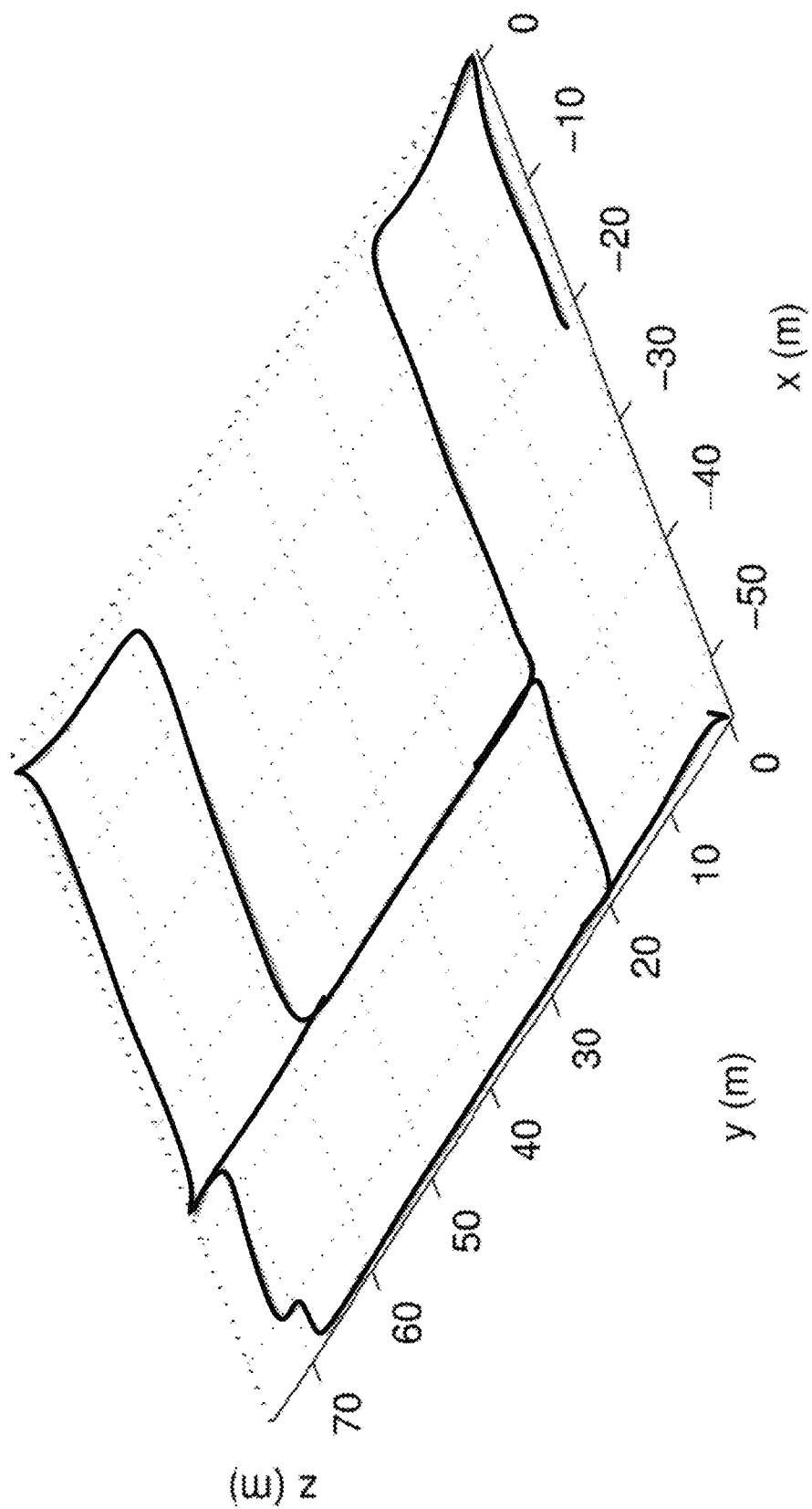

Datasets of FIG. 9A-9D correspond to trajectories of approximately 1300, 1000, 800, and 500 m, from which 181,140 points, 945 free lines, and 4,511 Manhattan lines are processed in CM. Of these features, 4,243 points, 18 free lines, and 148 Manhattan lines are common to two or more datasets FIGS. 8A-8C depict an estimated feature 3D point cloud, in accordance with the techniques of the disclosure. That is, FIG. 8A-8B depict a 3D point cloud from two different views. FIG. 8C depicts 3D Manhattan-line features following x, y, z directions.

Note in order to test the performance of the example CM algorithm with different number of commonly-observed features selected by the proposed feature-sparsification method, we collect these four datasets with significant trajectory overlaps in purpose. For datasets containing only a few hundred of common features, the feature-sparsification method does not have to be applied.

All the reported timing results are obtained by running the example CM algorithm on a desktop computer with an Intel® Xeon® E5-1650 v2 Processor (3.5 GHz). The parallelization is implemented using Intel's threading building blocks (TBB) library. All the matrix operations are performed utilizing the Eigen library [38], and the Cholesky factors, matrices $G_i$, are computed employing the Cholmod algorithm from the SuiteSparse library, which is also used in Google's standard non-linear least-squares solver, Ceres. Based on our tests, Cholmod is faster than other existing Cholesky factorization algorithms, such as the Simplicial Cholesky algorithm in Eigen and CSparse also from SuiteSparse. Cholmod is a sequential algorithm, but it is able to utilize a basic linear algebra subprograms (BLAS) library to process low-level matrix operations (e.g., matrix multiplication) in parallel. We tested the speed of three most widely used BLAS libraries: OpenBLAS (developed from GotoBLAS2), EigenBLAS (BLAS supported by the Eigen library), and Intel MKLBLAS, and MKLBLAS turns out to be the fastest one. Therefore, we utilize MKLBLAS for reporting the best timing results.

Data Preparation and Initial Estimate: In the example implementations of the techniques described herein, each user device first solves its own single-map (SM) estimation problem via BLS to determine its local trajectory and map. Each user device may utilize the following information:

(SM 1) An initial estimate for its trajectory and map: In our case, this is computed using a variant of the multi-state constrained Kalman filter (MSC-KF). Each MSC-KF operates on the IMU measurements and feature tracks collected by each user. Feature tracks correspond to Harris-corners extracted from each image and tracked using the Kanade-Lucas-Tomasi (KLT) algorithm. The subset of these feature tracks that pass the 2pt-RANSAC, are used by the MSC-KF to improve the estimated trajectory of each user. These tracks, however, are not used to detect loop closures.

(SM 2) Point Loop-closure detection (intra-dataset): To determine if a user has revisited an area, we follow a bag-of-words approach using ORB feature descriptors and employ our implementation of Nistér's vocabulary tree. These matches are confirmed after they pass a 3pt+1-RANSAC geometric-consistency test.

(SM 3) Line tracking: Line segments are extracted from images using a Line Segment Detection (LSD) algorithm. The line tracking process first creates hypotheses for each 3D line's orientation and position by considering all possible line vector pairs ($^1s_i$, $^1s_j$) between the first and the second image. Then, line segments from the third image are used to determine valid hypotheses. Line segment triplets that satisfy the three-image constraints are then considered as a line track, and are used to estimate a 3D line's parameters. Lastly, the line segments from image 1 that were not assigned to any 3D lines are discarded, while the unassigned line segments from images 2 and 3 are used to create new hypotheses that are validated using the segments from image 4. Note that the line segments of image 4 are first tested against the current set of tracks, and the remaining segments are used for hypothesis testing. This process is then repeated as new images are considered. The example algorithm below presents the details of one example of the line tracking procedure.

---

Algorithm 1: Line tracking procedure. Each line track consists of a set of line normals viewed in different poses.

Input: $\mathscr{S}_i$, i = 1,...,K the set of line segment normals viewed by each pose i, the camera poses $\check{p}$
Output: The set of line tracks $\mathscr{L}$ 1    $\mathscr{L}$ = { }; // Set of line tracks
2    for i = 3:K do
     // Check in current line tracks
3      foreach l ∈ $\mathscr{L}$, s ∈ $\mathscr{S}_i$ do
4        if ReprojectionLineTest(l, s, $\check{p}$) then
5          l ← l ∪ {s};
6          $\mathscr{S}_i$ ← $\mathscr{S}_i$ - {s};
7        end
8      end
     // Hypotheses generation
9      $\mathscr{H}$ = { }; // Set of line hypotheses
10     foreach $^1s$ ∈ $\mathscr{S}_{i-1}$, $^2s$ ∈ $\mathscr{S}_{i-2}$ do
11       $\mathscr{H}$ ← $\mathscr{H}$ ∪ {$^1s$, $^2s$};
12     end
     // Hypotheses validation
13     foreach l ∈ $\mathscr{H}$, s ∈ $\mathscr{S}_i$ do
14       if ReprojectionLineTest(l, s, $\check{p}$) then
15         l ← l ∪ {s};
16         $\mathscr{S}_i$ ← $\mathscr{S}_i$ - {s};
17         $\mathscr{L}$ ← $\mathscr{L}$ ∪ {l};
18       end
19     end
20    end

---

A second example line tracking and intra-dataset loop closure detection process (SM 3) is shown below.

---

Input $\mathscr{I}_k$ k = 1,...,K the set of images viewed by each pose k of the user j; the camera poses $^j\check{p}$ of the user j
Output: The set of line tracks $\mathscr{L}$ 1    $\mathscr{L}$ ← { }; // Initially empty set of 3D lines
     // Extract line normals of images
2    for k = 1 : K do
3      $\mathscr{S}_k$ ← LSD_Extract($\mathscr{I}_k$)
4    end
5    for k = 3 : K do
     // Test current line measurements against previous hypotheses
6      foreach h ∈ $\mathscr{L}$, s ∈ $\mathscr{S}_k$ do
7        if ReprojectionLineTest(h, s, $^j\check{p}$) then
8          Meas(h) ← Meas(h) ∪{(k,s)}
9          Param(h) ← TriangulateLine(Meas(h), $^j\check{p}$)

-continued

```
10          𝓕_k ← 𝓕_k - {s}
11       end
12    end
      // New hypotheses generation
13    𝓗 ← { }; // Potential line hypotheses
14    foreach s_{k-1} ∈ 𝓕_{k-1}, s_{k-2} ∈ 𝓕_{k-2} do
15       h ← ∅
16       Meas(h) ← {(k - 2,s_{k-2}),(k - 1,s_{k-1})}
17       Param(h) ← TriangulateLine(Meas(h), ʲp̈)
18       𝓗 ← 𝓗 ∪ {h}
19    end
      // Test current line measurements
         against new hypotheses
20    foreach h ∈ 𝓗, s ∈ 𝓕_k do
21       if ReprojectionLineTest(h, s, ʲp̈) then
22          Meas(h) ← Meas(h) ∪{(k,s)}
23          Param(h) ← TriangulateLine(Meas(h), ʲp̈)
24          𝓕_k ← 𝓕_k - {s}
25          𝓛 ← 𝓛 ∪ {h}
26       end
27    end
28 end
```

First, from each image $\mathcal{I}_k$; k=1; : : : ; K, line segments are extracted using a line segment detection (LSD) algorithm, and the corresponding line normals are assigned to the set $\mathcal{F}_k$ (see lines 2-4 of the above example algorithm). Then, for k≥3, each line normal $s_k \in \mathcal{F}_k$ is tested against the current (accepted as valid) 3D line hypotheses $\mathcal{L}$ (initially an empty set) by computing the re-projection errors. Note that each hypothesis comprises the triangulated line parameters and the corresponding set of pairs of image indices and line-normal measurements. The line normals which pass the test are added to the list of their accepting hypothesis and are removed from $\mathcal{F}_k$ to avoid re-processing (see lines 6-12 of the above example algorithm).

Afterwards, as shown in lines 13-19 of Algorithm 1, the line-tracking process creates a new set $\mathcal{H}$ of candidate 3D lines by assuming each possible pair of line normals $s_{k-2} \in \mathcal{F}_{k-2}$ and $s_{k-1} \in \mathcal{F}_{k-1}$ corresponds to measurements of a single 3D line observed at poses k−2 and k−1, respectively.

Subsequently, each hypothesis $h \in \mathcal{H}$ is validated by computing the re-projection error of each line normal $s_k \in \mathcal{F}_k$. If this is smaller than a threshold (currently set to 0.01), h is updated with $s_k$ and is added to $\mathcal{L}$. These steps are shown in lines 20-27 of the example algorithm.

Once the line-tracking process is completed, the subset of line tracks corresponding to the cardinal directions of the building (environment) may be identified using a RANSAC-based vanishing point estimator. Lastly, we use the trajectory and line estimates of each user's BLS to find loop-closure line features by accepting free or Manhattan lines at poses where loop-closure point features have previously been found. In particular, if any of these free or Manhattan lines are close to each other (i.e., the difference of their distance and direction parameters are within one degree and 15 cm, respectively), they are accepted as loop-closure measurements.

Once each user has solved its own SM problem, they communicate to the CM their estimated trajectories, maps, Cholesky factors, and all available visual-inertial measurements. At this point, another step of preprocessing is required to compute the following quantities:

(CM 1) Inter-dataset point feature loop-closure detection: To achieve this, we follow the same procedure as in (SM 2), and determine the matched images and corresponding common landmarks across all datasets.

(CM 2) Inter-dataset line feature loop closure detection: We follow a process similar to (SM 3) using the resulting CM trajectory.

(CM 3) Relative transformation initialization: Once common point features are identified, we compute an initial estimate for the unknown 4 DOF transformation between user pairs.

Once the above pre-processing steps are complete, the CM techniques described herein are employed to estimate the trajectories of all users as well as the combined map. The results from our experiments are summarized in the following section.

Evaluation Results for using Line Features in addition to Point Features: The achieved accuracy of the example CM algorithm can be qualitatively assessed by observing the CM estimated trajectories of all users for the Keller Hall datasets shown in FIG. 10. Note that we intentionally instructed the users collecting data to keep the camera at about the same height, and walk in the middle of fairly narrow corridors. Correspondingly, the z (height) estimated for all users' trajectories remains about the same in the x-z view of the trajectory estimates, FIG. 10 (c), despite the fact that they have travelled for hundreds of meters across multiple floors. Moreover, in the x-y view, i.e., FIG. 10 (b), the user trajectories on different floors overlap almost exactly.

In addition to the qualitative results, we also present a ground-truth comparison. Specifically, we placed four April-Tags in the far corners of a single floor within the building and used the building's blueprints to find the true distance (ground truth) between any pair of AprilTags. Then, to compute the estimated distance between AprilTags, we employ a PnP algorithm to find an observed AprilTag's position expressed with respect to the camera's frame, and use the CM estimate of the camera frame to express the AprilTag with respect to the global frame. Specifically, defining the PnP estimated position of an AprilTag $\{A_j\}$, in the reference of the observing camera frame $\{C_k\}$, as $^{C_k}p_{A_j}$, this AprilTag's position in the global frame of reference is expressed as:

$$^Gp_{A_j} = {}^G_{C_k}C \, {}^{C_k}p_{A_j} + {}^Gp_{C_k} \quad (45A)$$

Alternatively, to compute the estimated distance between AprilTags, we employ a PnP algorithm to find an observed camera's pose, $(^{A_n}p_{C_k}, {}^{A_n}_{C_k}C)$, with respect to each AprilTag's frame, and then use the CM estimate of the camera's global pose, $(^Gp_{C_k}, {}^G_{C_k}C)$, to express each AprilTag with respect to the global frame {G} as:

$$^Gp_{A_n} = {}^Gp_{C_k} - {}^G_{C_k}C \, {}^{A_n}_{C_k}C^T \, {}^{A_n}p_{C_k} \quad (45B)$$

Then, we average the estimated positions of each AprilTag across all camera observations and compute the estimated pairwise distances between AprilTags. For example, the estimated distance between two AprilTags, $\{A_i\}$ and $\{A_j\}$, are computed as $\|{}^Gp_{A_i} - {}^Gp_{A_j}\|$. Lastly, we report the algorithm accuracy by comparing the difference between the estimated and true distances between all AprilTags. Note the distance from the camera to the AprilTag is relatively small as compared to the distance between AprilTags (about 0.4 m compared to over 80 m) so any error in the PnP estimate will negligibly affect the result.

Figure 11:
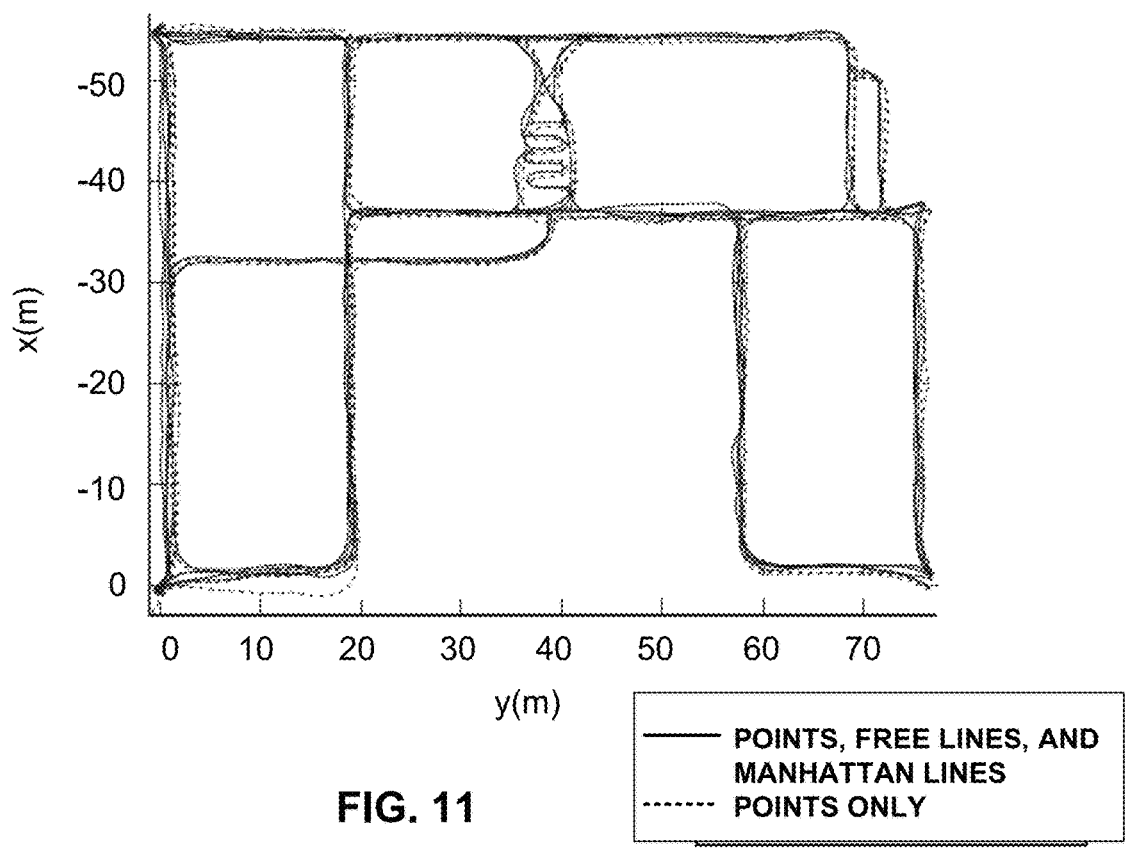
FIG. 11 illustrates trajectories of all users in Keller Hall using points-only versus points, free lines, and Manhattan lines, in accordance with the techniques of the disclosure.

FIG. 11 illustrates trajectories of all users in Keller Hall using points-only versus points, free lines, and Manhattan lines, in accordance with the techniques of the disclosure. The effect of using free and Manhattan lines can be observed in FIG. 11, where the absolute and relative errors in the pairwise distance between AprilTags found from this method when using only points versus when using points, free-lines, and Manhattan-lines are 63 cm (0.84%) and 48 cm (0.64%), respectively. In addition, at the position of the trajectory shown at bottom-left of FIG. 11, no loop-closure occurs, and when only points are used the estimated user trajectory is about 1.7 m off, while this error is corrected by processing line features. Moreover, the trajectory estimated when employing only point features has a small, but noticeable yaw error. This error, however, is corrected when Manhattan lines are also used since they provide attitude information between the user's frame and the building frame, which makes yaw observable.

Evaluation Results for Sparse CM: We compare the following four approximate algorithms with the CM exact solution: (i) The initialization of the example CM algorithm: Align the BLS estimated single-user maps using the inter-dataset transformation computed by the method described in Section V-B; (ii)-(iv) Sparse CM, i.e., CM with commonly-observed feature sparsification as described in Section V-D, using grids of size 8×8 m², 4×4 m², and 1×1 m², respectively. The common point features before and after sparsification are shown in FIG. 14.

The resulting number of common point features, dimension of total common point, free-line and Manhattan-line feature constraint, and the position RMSE (with respect to CM estimates) of (i)-(iv) and CM are shown in Table I.

TABLE I

Number of common point features, the dimension of common point, free-line, and Manhattan-line feature constraint, and position RMSE of sparse CM compared to exact CM

| Algorithms | Feature count | Constraint dimension | Position RMSE (cm) |
|---|---|---|---|
| Initialization | 0 | 0 | 258.3 |
| 8 m grid | 223 | 1050 | 13.5 |
| 4 m grid | 488 | 2063 | 8.8 |
| 1 m grid | 1,507 | 5877 | 5.7 |
| Exact | 4,243 | 16912 | 0 |

Figure 12:
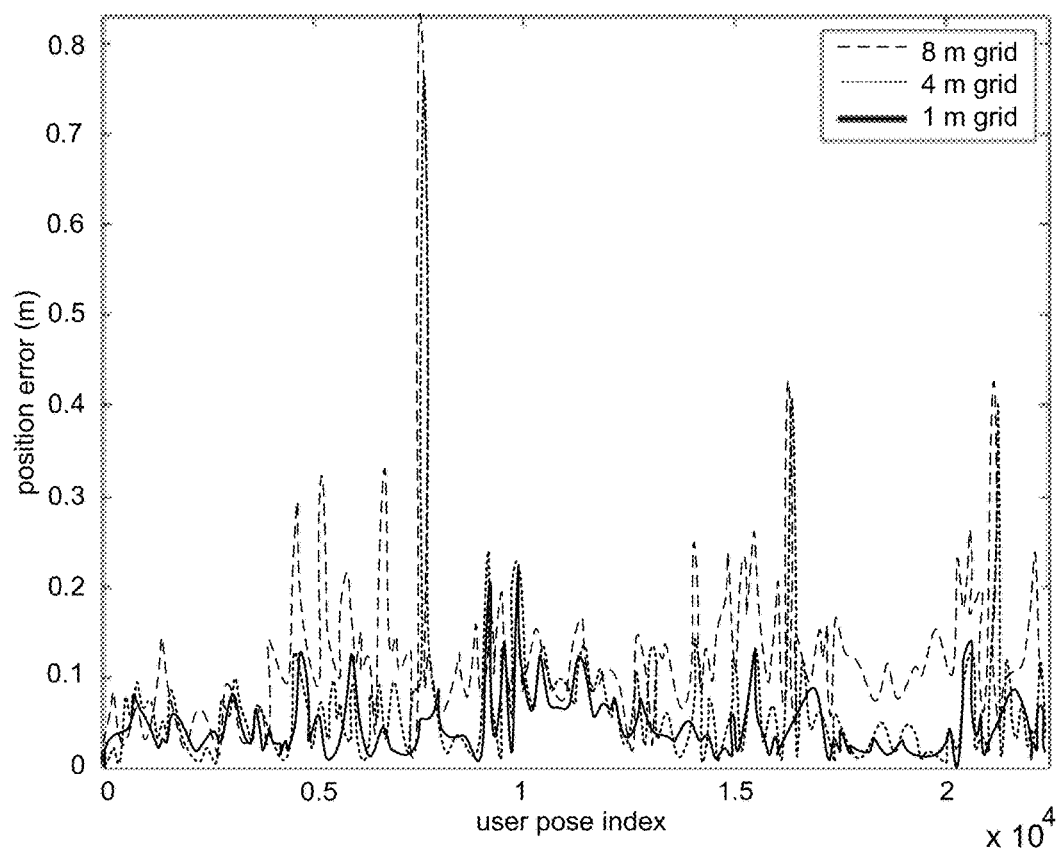
FIG. 12 is a graph illustrating position difference of sparse CM over the users' trajectories with respect to CM, in accordance with the techniques of the disclosure.

Additionally, we present the position difference of sparse CM (ii)-(iv) with respect to CM over all user trajectories in FIG. 12. FIG. 12 is a graph illustrating position difference of sparse CM over the users' trajectories with respect to CM, in accordance with the techniques of the disclosure. Note that since the position error of the CM initialization algorithm is much bigger, it is not plotted to keep the difference between the rest of algorithms visible. According to FIG. 12, after the common-feature sparsification process, the position difference is at maximum 0.82 m, and typically below 0.2 m for all sparse CM algorithms considered. To visually evaluate how much this level of position RMSE affects the user trajectories, we depict the estimated trajectory from the sparse CM using grids of size 8×8 m2 versus CM in FIG. 13. FIG. 13 illustrates trajectories estimated from original CM and sparse CM with common-feature sparsification using a grid size of 8×8 m², in accordance with the techniques of the disclosure. Notice that the sparse CM preserves about 5% of the common-feature constraints, while obtains an estimate that has very small position difference from the exact CM estimate. The intuition behind this result is that since only two point features are required to compute the transformation between two maps, a few hundred (instead of several thousand) common-feature constraints are adequate to create an accurate merged map.

The timing results of the aforementioned example algorithms are reported in Table II.

TABLE II

Timing comparison between CM and BLS with different number of commonly-observed features (in seconds)

| Algorithms | 8 m grid | 4 m grid | 1 m grid | Exact |
|---|---|---|---|---|
| $G_i$ | 13.5 | 13.5 | 13.5 | 13.5 |
| $K_i$ | 4.8 | 9.7 | 29.3 | 85.7 |
| $K^T K$ | 1.2 | 4.5 | 36.4 | 334.2 |
| $T_{11}$ | 0.04 | 0.2 | 5.0 | 114.5 |
| CM total | 19.5 | 27.9 | 84.2 | 547.9 |
| BLS | 32.9 | 34.4 | 37.4 | 41.6 |

The timings for CM initialization is not listed because no computation is required for merging maps from different users. In general, all the example algorithms converge after 5-10 Gauss-Newton iterations. For comparison, we also report the timing results for solving the equivalent BLS formulation [see (29)] using the Cholmod Cholesky-factorization algorithm. As shown in the table, the sparse CM takes significantly less time compared to the exact CM solution. Moreover, when the number of common features are in the level of hundreds (as shown in Table I, 233 for 8 m grid and 488 for 4 m grid), the proposed CM solver is much faster than the equivalent BLS solver. Furthermore, since the Cholesky factors, $G_i$ matrices, can be reused from each single-user BLS in the first iteration, additional time can be saved in the proposed CM solution. Lastly, note the time for computing matrices $G_i$, $K_i$, $K^T K$, and $T_{11}$ grows constantly, linearly, quadratically, and cubically with increasing dimension of the common-feature constraint (as shown in Table I). This result verifies our computational complexity analysis, which indicates the computational cost of the CM solution can be controlled by adjusting the number of commonly-observed features.

We also compared the peak memory usage between the proposed CM solver and the equivalent BLS solver in Table III.

TABLE III

Peak memory usage comparison between the example CM algorithm and the BLS formulation (in GB)

| Algorithms | 8 m grid | 4 m grid | 1 m grid | Exact |
|---|---|---|---|---|
| CM algorithm | 1.37 | 1.37 | 1.37 | 1.37 |
| Equivalent BLS | 4.41 | 4.72 | 4.97 | 5.60 |

The peak memory usage of the CM solver is reached when computing the Cholesky factorization, $G_i$, of the Hessian matrix corresponding to the largest dataset, which does not change with the number of commonly-observed features. Note that computing $K_i$ and $K^T K$ matrices in parallel may consume more memory, but it can be reduced by limiting the number of tasks processed in parallel. The extreme case would be to compute $K_i$ and $K^T K$ matrices in a single thread which requires very limited memory. On the other hand, the peak memory usage of the BLS solver happens during the Cholesky factorization of the Hessian corresponding to the merged dataset. Since the Cholesky factorization consumes memory proportional to the size of the Hessian matrix, the memory usage of the BLS solution is about 4 times larger. In addition, this memory usage grows with increasing number of common features, because they introduce correlations between different datasets. Note the memory usage is particularly important for running the mapping algorithm on mobile devices, which have very limited available RAM (e.g., iPhone 6 has only 1 GB RAM) and need to run other processes concurrently (e.g., the android operating system).

In summary, when the number of common features is in the order of hundreds, the proposed CM solution is much more efficient than the standard BLS solution in terms of both computational cost and memory usage. If the number of common features increases to the order of thousands, the CM solution is still less memory demanding but requires significantly more computations. In such case, we can speed up the CM solution by selecting a informative subset of the common features whose number can be analytically determined according to the affordable computational cost, and the estimates from the resulting sparse CM have very small difference from exact one.

This disclosure describes cooperative mapping (CM) algorithms for combining visual and inertial measurements collected using mobile devices by multiple users at different times across large indoor spaces. We considered the most general case, where the users' relative transformation is not known and cannot be inferred by directly observing each other. Our formulation of CM as a Batch Least Squares (BLS) equivalent constrained-optimization problem offers significant advantages when processing multiple maps: (i) Resource awareness, as the computational cost can be adjusted by changing the number of commonly-observed feature constraints; (ii) Computational gains, as the most computational intensive operations can be processed in parallel, and partial results regarding the trajectory and map of each user can be re-used; (iii) Memory savings, as the Cholesky factorization is applied on the Hessian of each user's data sequential, but not on the Hessian of the merged data from all users. Furthermore, we utilize free-line and Manhattan-line features in addition to point features, which improves the estimation accuracy and particularly corrects the "yaw" error. A large-scale CM experiment was conducted demonstrating the performance of the example algorithm in terms of accuracy and processing speed when using point, free-line, and Manhattan-line visual measurements.

Figure 15:
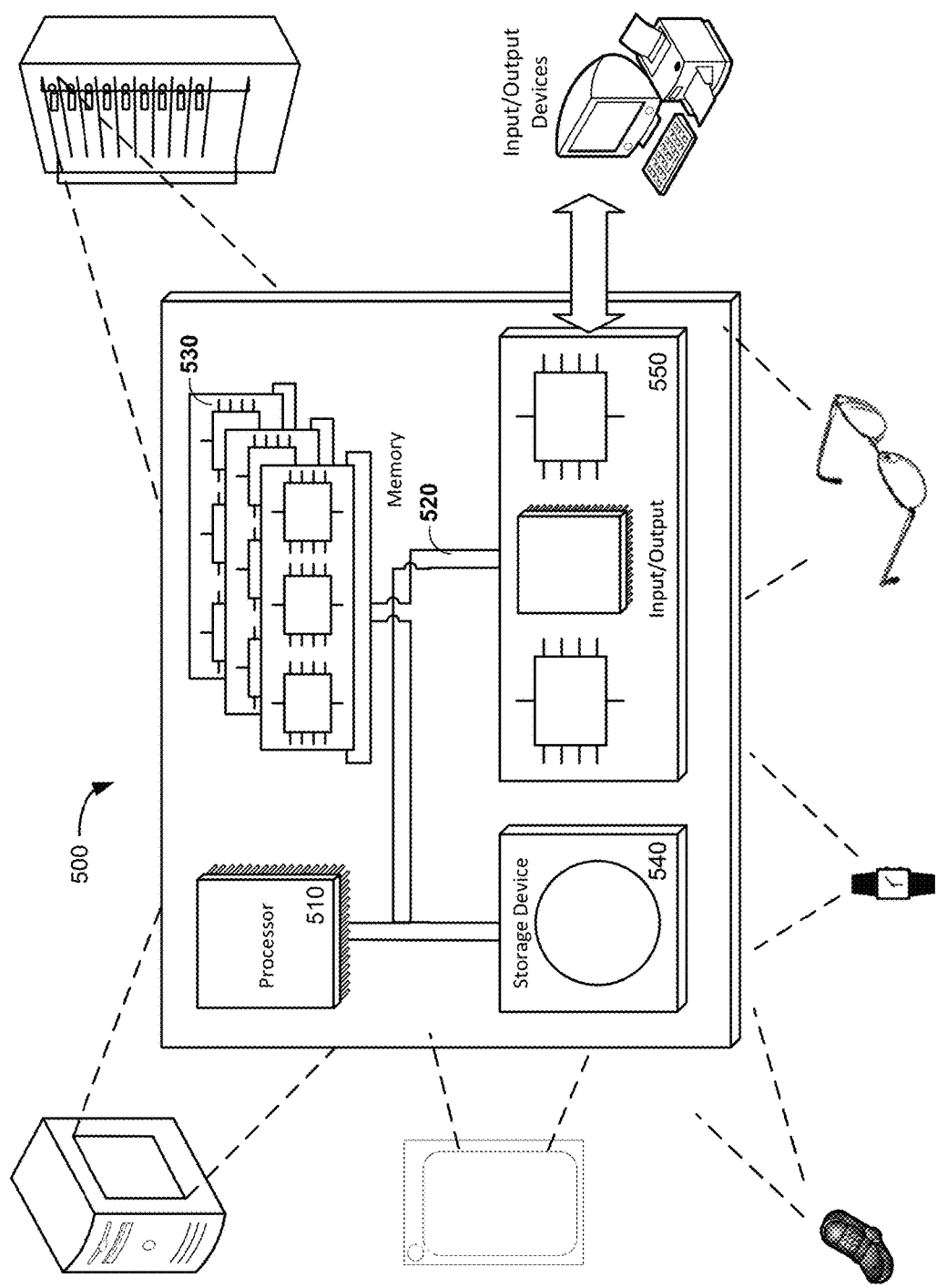
FIG. 15 shows a detailed example of various devices that may be configured to implement some embodiments in accordance with the current disclosure, in accordance with the techniques of the disclosure.

FIG. 15 shows a detailed example of various devices (generally referred to as a computing platform) that may be configured to implement some embodiments, in accordance with the techniques of the disclosure. For example, device 500 may be a robot, mobile sensing platform, a mobile phone, a wearable device such as a smartphone or smart watch, a workstation, a cloud-based computing center, a cluster of servers or other example embodiments of a computing environment, centrally located or distributed, capable of executing the techniques described herein. Any or all of the devices may, for example, implement portions of the techniques described herein for vision-aided inertial navigation systems.

In this example, a computer 500 includes a hardware-based processor 510 that may be incorporated into VINS 10 or any device or system to execute program instructions or software, causing the computer to perform various methods or tasks, such as performing the techniques described herein. Processor 510 may be a general-purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

Various embodiments of the invention have been described. Further examples are contemplated herein. These and other embodiments are within the scope of the following claims.

What is claimed is:

1. A method comprising:
receiving, with a computing platform having one or more hardware-based processors, respective trajectory data and map data independently generated by each of a plurality of vision-aided inertial navigation devices (VINS devices) traversing an environment, wherein the trajectory data specifies poses along a path through the environment for the respective VINS device and the map data specifies positions of observed features within the environment as determined by an estimator executed by the respective VINS device;
determining, with the computing platform and based on the respective trajectory data and map data from each of the VINS devices, estimates for relative poses within the environment by determining transformations that geometrically relate the trajectory data and the map data between one or more pairs of the VINS devices; and
generating, with the computing platform and based on the transformations, a composite map that specifies positions within the environment for the features observed by any of the VINS devices.

2. The method of claim 1, further comprising:
identifying features that are commonly observed by two or more of the VINS devices;
for each of the commonly observed features, determining, with the computing platform, a geometric constraint that imposes geometric consistency for the feature based on the map data from each of the two or more VINS devices that observed the feature; and
generating composite maps based on the transformations geometrically relating the map data received from the plurality of VINS devices and by imposing the geometric constraints computed from the commonly observed features.

3. The method of claim 2, further comprising selecting, based on computing resources available within the computing platform, only a subset of the commonly observed features for which to compute respective geometric constraints to be applied when generating the composite map.

4. The method of claim 3, wherein, while generating the composite map, excluding computation of respective geometric constraints for any unselected commonly observed features and instead treating any unselected commonly observed feature as different features within the map data for the two or more VINS that observed the feature.

5. The method of claim 3, wherein selecting only the subset of the commonly observed features for which to compute the respective geometric constraints further comprises:
partitioning the composite map into a plurality of regions; and
selecting an equal number subset of the features within each of the regions, wherein the number of features for inclusion in the subsets is determined based on the computing resources within the computing platform.

6. The method of claim 5, wherein selecting the equal number subset of the features comprises:
ranking, within each of the regions, the features based on the number of VINS that commonly observed the feature; and
selecting, for each of the regions, the features that were commonly observed by the most number of the VINS devices until the number of features for inclusion within the subset has been selected.

7. The method of claim 5, wherein selecting the subset of the features for each of the regions comprises:
projecting each of the features within the respective region onto a two dimensional X-Y plane for that region such that features within the region having the same X-Y positions are combined on the X-Y plane;
selecting the features for the subset from the projected features on the X-Y plane.

8. The method of claim 1, wherein generating the relative estimates further comprises:
constructing a tree in which each node represents a different one of the VINS devices and each link between pairs of nodes is assigned a weight representing the number of commonly observed features between the pair of VINS devices;
selecting, based on the weights of the links, a chain through the tree that links all of the nodes; and
determining the transformations only between pairs of the VINS devices that are neighboring nodes along the selected chain.

9. The method of claim 1, further comprising communicating the composite map to a VINS device for navigation within the environment.

10. The method of claim 1,
wherein the features represent objects visible within the environment, and
wherein the vision-aided inertial navigation system is integrated within a tablet computer, a laptop computer, a mobile phone, a wearable computing device, a robot, a vehicle, or an unmanned aircraft system (UAS).

11. A vision-aided inertial navigation system comprising:
a plurality of mobile devices, each of the mobile devices comprising:
at least one image source to produce image data along a trajectory of the mobile device within an environment, wherein the image data contains a plurality of features observed within the environment at a plurality of poses of the mobile device along the trajectory;
an inertial measurement unit (IMU) to produce IMU data indicative of motion of the vision-aided inertial navigation system; and
a hardware-based processing unit comprising an estimator that determines, based on the image data and the IMU data, trajectory data specifying a position and orientation of the mobile device for a plurality of poses of the mobile device along the trajectory and map data specifying positions with the environment for features observed from the poses; and
a cooperative mapping server configured to:
receive respective trajectory data and map data independently generated by each of mobile devices;

determine transformations that geometrically relate the trajectory data and the map data between one or more pairs of the mobile devices; and generating, with the computing platform and based on the transformations, a composite map that specifies positions within the environment for the features observed by any of the mobile devices.

12. The vision-aided inertial navigation system of claim 11, wherein the cooperative mapping server is further configured to:

identify features that are commonly observed by two or more of the mobile devices;

for each of the commonly observed features, determine a geometric constraint that imposes geometric consistency for the feature based on the map data from each of the two or more mobile devices that observed the feature; and generate composite maps based on the transformations geometrically relating the map data received from the plurality of mobile devices and by imposing the geometric constraints computed from the commonly observed features.

13. The vision-aided inertial navigation system of claim 12, wherein the cooperative mapping server is further configured to select, based on computing resources available within the cooperative mapping serve, only a subset of the commonly observed features for which to compute respective geometric constraints to be applied when generating the composite map.

14. The vision-aided inertial navigation system of claim 13, wherein, while generating the composite map, the cooperative mapping server is further configured to exclude computation of respective geometric constraints for any unselected commonly observed features and instead treat any unselected commonly observed feature as different features within the map data for the two or more mobile devices that observed the feature.

15. The vision-aided inertial navigation system of claim 13, wherein, to select only the subset of the commonly observed features for which to compute the respective geometric constraints, the cooperative mapping server is further configured to:

partition the composite map into a plurality of regions; and select an equal number subset of the features within each of the regions, wherein the number of features for inclusion in the subsets is determined based on the computing resources within the cooperative mapping server.

16. The vision-aided inertial navigation system of claim 15, wherein to select the equal number subset of the features, the cooperative mapping server is further configured to:

rank, within each of the regions, the features based on the number of VINS that commonly observed the feature; and select, for each of the regions, the features that were commonly observed by the most number of the mobile devices until the number of features for inclusion within the subset has been selected.

17. The vision-aided inertial navigation system of claim 15, wherein to select the subset of the features for each of the region, the cooperative mapping server is further configured to:

project each of the features within the respective region onto a two dimensional X-Y plane for that region such that features within the region having the same X-Y positions are combined on the X-Y plane;

select the features for the subset from the projected features on the X-Y plane.

18. The vision-aided inertial navigation system of claim 11, wherein to generate the relative estimates, the cooperative mapping server is further configured to:

construct a tree in which each node represents a different one of the mobile devices and each link between pairs of nodes is assigned a weight representing the number of commonly observed features between the pair of mobile devices;

select, based on the weights of the links, a chain through the tree that links all of the nodes; and determine the transformations only between pairs of the mobile devices that are neighboring nodes along the selected chain.

19. The vision-aided inertial navigation system of claim 11, wherein the cooperative mapping server is further configured to communicate the composite map to a mobile device for navigation within the environment.

20. The vision-aided inertial navigation system of claim 11, wherein the mobile devices comprise any of a tablet computer, a laptop computer, a mobile phone, a wearable computing device, a robot, a vehicle, or an unmanned aircraft system (UAS).

21. A non-transitory computer-readable medium comprising instructions that, when executed, cause one or more hardware-based processors of a computing platform to:

receive respective trajectory data and map data independently generated by each of a plurality of vision-aided inertial navigation devices (VINS devices) traversing an environment, wherein the trajectory data specifies poses along a path through the environment for the respective VINS device and the map data specifies positions of observed features within the environment as determined by an estimator executed by the respective VINS device;

determine, based on the respective trajectory data and map data from each of the VINS devices, estimates for relative poses within the environment by determining transformations that geometrically relate the trajectory data and the map data between one or more pairs of the VINS devices; and generate, based on the transformations, a composite map that specifies positions within the environment for the features observed by any of the VINS devices.

* * * * *